(12) United States Patent
Andreessen et al.

(10) Patent No.: US 7,756,945 B1
(45) Date of Patent: *Jul. 13, 2010

(54) INTERACTING WITH A SHARED DATA MODEL

(75) Inventors: Marc L. Andreessen, Palo Alto, CA (US); Steven Vassallo, Redwood City, CA (US); Eric Reed Meeks, San Francisco, CA (US); Dermot Martin Gately, San Bruno, CA (US); David Sklar, New York, NY (US)

(73) Assignee: Ning, Inc., Mountain View, CA (US)

( * ) Notice: Subject to any disclaimer, the term of this patent is extended or adjusted under 35 U.S.C. 154(b) by 1081 days.

This patent is subject to a terminal disclaimer.

(21) Appl. No.: 11/195,349

(22) Filed: Aug. 2, 2005

(51) Int. Cl.
*G06F 15/16* (2006.01)

(52) U.S. Cl. ...................... 709/217; 709/203

(58) Field of Classification Search ......... 709/202–204, 709/216–219, 224–232
See application file for complete search history.

(56) References Cited

U.S. PATENT DOCUMENTS

| | | | |
|---|---|---|---|
| 5,446,891 A | 8/1995 | Kaplan et al. | |
| 5,892,905 A | 4/1999 | Brandt et al. | |
| 6,009,410 A | 12/1999 | LeMole et al. | |
| 6,167,522 A | 12/2000 | Lee et al. | |
| 6,314,451 B1 | 11/2001 | Landsman et al. | |
| 6,356,934 B1* | 3/2002 | Delph | 709/204 |
| 6,754,885 B1 | 6/2004 | Dardinski et al. | |
| 6,766,298 B1 | 7/2004 | Dodrill et al. | |
| 6,934,740 B1* | 8/2005 | Lawande et al. | 709/213 |
| 7,043,716 B2 | 5/2006 | Zimmer et al. | |
| 7,139,761 B2* | 11/2006 | McKibben et al. | 707/10 |
| 7,149,287 B1 | 12/2006 | Burger et al. | |
| 7,269,590 B2 | 9/2007 | Hull et al. | |
| 7,281,008 B1 | 10/2007 | Lawrence et al. | |
| 7,433,876 B2 | 10/2008 | Spivack et al. | |
| 7,502,855 B2* | 3/2009 | Swanson et al. | 709/225 |
| 2001/0051985 A1 | 12/2001 | Haverstock et al. | |
| 2003/0105811 A1* | 6/2003 | Laborde et al. | 709/203 |
| 2003/0149975 A1 | 8/2003 | Eldering et al. | |
| 2003/0187921 A1 | 10/2003 | Diec | |
| 2004/0083264 A1* | 4/2004 | Veselov | 709/204 |
| 2004/0143569 A1 | 7/2004 | Gross et al. | |
| 2004/0187136 A1* | 9/2004 | Bhogal et al. | 719/311 |
| 2005/0015809 A1 | 1/2005 | Boys | |
| 2005/0097006 A1 | 5/2005 | Nyako | |
| 2005/0102324 A1 | 5/2005 | Spring et al. | |
| 2005/0138564 A1 | 6/2005 | Fogg | |
| 2005/0149500 A1 | 7/2005 | Marmaros et al. | |
| 2005/0160094 A1 | 7/2005 | Morgenstern et al. | |
| 2005/0193054 A1 | 9/2005 | Wilson et al. | |
| 2005/0216300 A1 | 9/2005 | Appelman et al. | |

(Continued)

OTHER PUBLICATIONS

Jotspot, Jotspot—The Application Wiki, http://www.jot.com/index.php.

(Continued)

*Primary Examiner*—Yasin Barqadle
(74) *Attorney, Agent, or Firm*—Fenwick & West LLP

(57) ABSTRACT

Interacting with a shared data model is disclosed. Interacting includes requesting information associated with an attribute from the shared data model, forming a request for content based on the information, and sending the request.

31 Claims, 32 Drawing Sheets

U.S. PATENT DOCUMENTS

| | | |
|---|---|---|
| 2006/0026668 A1 | 2/2006 | Karoubi |
| 2006/0122974 A1 | 6/2006 | Perisic |
| 2006/0195460 A1* | 8/2006 | Nori et al. .................. 707/100 |
| 2006/0195521 A1 | 8/2006 | New et al. |
| 2006/0242178 A1 | 10/2006 | Butterfield et al. |
| 2006/0242554 A1 | 10/2006 | Gerace et al. |
| 2006/0248573 A1 | 11/2006 | Pannu et al. |
| 2007/0088671 A1 | 4/2007 | McElroy et al. |
| 2008/0086564 A1 | 4/2008 | Putman et al. |
| 2008/0201299 A1 | 8/2008 | Lehikoinen et al. |

OTHER PUBLICATIONS

Customforce, Customizable CRM-Salesforce.com, www.customforce.com.
Blogger, Blogger: Create your Blog Now, http://www.jot.com/index.php.
Textdrive, http://www.textdrive.com/.
Yahoo, Yahoo! GeoCities, http://geocities.yahoo.com/.
Bluehost, Web hosting provider—Bluehost.com, http://www.bluehost.com/.
Macromedia, ColdFusion MX 7, http://www.macromedia.com/software/coldfusion/.
BEA, BEA Systems, http://www.bea.com/framework.jsp?CNT=homepage—main.jsp&FP=/content.
IBM, IBM WebSphere Software, http://www-306.ibm com/software/websphere/#.
JBoss, JBoss.com-Professional Open Source™ from JBoss Inc. , http://www.jboss.com/.
Bayeh, E., "The WebSphere Application Server Architecture and Programming Model," IBM Systems Journal, Java Technology, 1998, vol. 37, No. 3 [online] [Retrieved on Jun. 16, 2008] Retrieved from the Internet<URL:http://www.research.ibm.com/journal/sj/373/bayeh.html>.
Archive of "J2EE™ Developer's Guide — Scenarios," Sun Microsystems, Inc., pp. 1-4, [online] [Archived by http://archive.org on Nov. 11, 2001; Retrieved on Jun. 16, 2008] Retrieved from the Internet<URL: http://web.archive.org/web/20011119203713/java.sun.com/j2ee/sdk_1.2.1/techdocs/guides/ejb/html/Security4.html>.
Blogging Software, Business Blogs & Blog Services at TypePad.com, www.typepad.com.
Apache Tomcat, The Apache Software Foundation, http://tomcat.apache.org/.
The Apache Software Foundation, http://apache.org.
Archive of Flickr, "Photo Tags," www.flickr.com/photos/tags, pp. 1-3, [Online] [Archived by http://archive.org on Jun. 7, 2004; Retrieved on Nov. 25, 2007] Retrieved from the Internet<URL:http://web.archive.org/web/20040607053757/http://www.flickr.com/photos/tags>.
Archive of Flickr Photo Sharing Website, www.flickr.com/photos/tags, pp. 1-2, [Online] [Archived by http://archive.org on Apr. 24, 2005; Retrieved on Aug. 30, 2008] Retrieved from the Internet<URL:http://web.archive.org/web/20050424233308/flickr.com/photos/tags/>.
Archive of Mathes, A. "Folksonomies—Cooperative Classification and Communication Through Shared Metadata," pp. 1-20, [Online] [Archived by http://archive.org on Dec. 30, 2004; Retrieved Nov. 25, 2007] Retrieved from the Internet<URL:http://web.archive.org/web20041230205122/http://www.adammathes.co m/academic/computer-mediated-communication/folsonomies.html>.
Bal, H.E. et al., "A Distributed Implementation of the Shared Data-Object Model," 1989, [Online] Retrieved from the Internet<URL:http://citeseerx.ist.psu.edu/viewdoc/summary?doi=10.1.1.45.1878>.
Linderman, M. "The Spread of Weighted Lists," Dec. 2, 2004, pp. 1-4, [Online] [Retrieved on Nov. 25, 2007] Retrieved from the Internet<URL:http://www.37signals.com/svn/archives/000937.php>.
Sturtz, D.N., "Communal Categorization: The Folksonomy," Dec. 16, 2004, pp. 1-8, [Online] [Retrieved on] Retrieved from the Internet<URL:http://www.davidsturtz.com/drexel/622/sturtz-folksonomy.pdf>.
United States Notice of Allowance and Fee(s) Due, U.S. Appl. No. 11/213,309, Jun. 26, 2009, 13 pages.
United States Office Action, U.S. Appl. No. 11/134,250, Jun. 23, 2008, 23 pages.
United States Office Action, U.S. Appl. No. 11/134,250, Nov. 18, 2008, 50 pages.
United States Office Action, U.S. Appl. No. 11/134,250, May 5, 2009, 26 pages.
United States Office Action, U.S. Appl. No. 11/134,250, Dec. 15, 2009, 20 pages.
United States Office Action, U.S. Appl. No. 11/141,983, Jan. 9, 2008, 16 pages.
United States Office Action, U.S. Appl. No. 11/141,983, Sep. 3, 2008, 17 pages.
United States Office Action, U.S. Appl. No. 11/141,983, Mar. 18, 2009, 15 pages.
United States Office Action, U.S. Appl. No. 11/195,378, Mar. 10, 2008, 44 pages.
United States Office Action, U.S. Appl. No. 11/195,378, Sep. 29, 2008, 42 pages.
United States Office Action, U.S. Appl. No. 11/195,378, Jun. 23, 2009, 46 pages.
United States Office Action, U.S. Appl. No. 11/195,378, Dec. 18, 2009, 52 pages.
United States Office Action, U.S. Appl. No. 11/213,309, Nov. 28, 2007, 19 pages.
United States Office Action, U.S. Appl. No. 11/213,309, Dec. 23, 2008, 21 pages.
Hatala, M. et al., "Global vs. Community Metadata Standards: Empowering Users for Knowledge Exchange," Technical University of British Columbia, Jan. 1, 2002. Retrieved from the Internet <URL: http://lore.iat.sfu.ca/pubs/sw2002-hatala-richards.pdf>, 16 pages.
Tosh, D. et al., "Creation of a Learning Landscape: Weblogging and Social Networking in the Context of e-Portfolios," The University of Edinburgh, Jul. 15, 2004. Retrieved from the Internet <URL: http://eduspaces.net/bwerdmuller/files/61/179/Learning_landscape.pdf>, 8 pages.

* cited by examiner

| Name | Value | Type |
|---|---|---|
| content_detail-id | "346" | number |
| app_id | "47" | number |
| contributor | "ginab" | string |
| date_created | "11/04/2004 13:14:55" | date |
| date_lastmodified | "11/04/2004 17:35:01" | date |
| url_lastused | "http://ericsplace.Ning.com" | string |
| tagcount | "22" | number |

520

| Name | Value | Type |
|---|---|---|
| private | "false" | string |
| content_type | "discussion_post" | string |

| Name | Value | Type |
|---|---|---|
| Examples of System Provided Content Attributes ||| 
| title | "At the Beach" | string |
| description | "Sea Lions" | string |
| filename | "/contentrepository/pics/..." | file.image |
| date_taken | "10/23/2004 12:22:35" | date |
| Examples of Application Defined Content Attributes |||
| location | "Pescadero Beach" | string |
| width | "1600 pixels" | string |
| height | "1200 pixels" | string |
| hresolution | "300 dpi" | string |
| vresolution | "300 dpi" | string |
| bitdepth | "24" | number |
| make | "Canon Corporation" | string |
| cameramodel | "Canon D60" | string |

| Name | Value | Type |
|---|---|---|
| Examples of System Provided Content Attributes | | |
| title | "Antique Dresser" | string |
| description | "Bought in 2001. Paid more than $3K" | string |
| price | "1,200" | number |
| photo | "/contentrepository/pics/..." | file.image |
| Examples of Application Defined Content Attributes | | |
| city | "San Bruno" | string |
| state | "California" | string |
| bestoffer | "yes" | String (boolean maybe) |
| genre | "Elizabethan" | string |
| forsale_wanted | "for sale" | string |

Flow from Registered User -> Profile -> Application -> Content -> Tag

| Registered User | | | | Profile | | |
|---|---|---|---|---|---|---|
| One registered user per 'confirmed email address' | Desc | Example Value | | Each registered user can have one more more 'profiles' | Desc | Example Value |
| REGISTERED USER | | | | PROFILE | | |
| Registered user ID | Unique ID | 111 | | profile id | Unique ID | 222 |
| | | | | registered user id | Related parent | 111 |
| | | | | profile screen name | Nickname or screen name | johndoe |
| | | | | email ID | Email ID of user... | a@a.com |
| | | | | preferred language | | |
| date created | | | | date created | | |
| date last changed | | | | date last changed | | |
| | | | | | | |
| | | | | | | |
| | | | | | | |
| | | | | | | |
| | | | | | | |

| Application | | | Content | | |
|---|---|---|---|---|---|
| Each user profile can create one or more 'applications' | Desc | Example Value | Each application can own one or more pieces of 'content' | Desc | Example Value |
| APPLICATION | | | CONTENT | | |
| app_id | Unique ID | 333 | content id | Unique ID | 444 |
| creator profile id | Owner | 222 | content type | E.g. blog or photoalbum | blog |
| app name | | My City Blog | private content Y/N | Private to this app? | Y |
| app url | | cityblog | owning app id | Created by this app ID | 333 |
| app location on disk | | | originating profile id | Created by this user | 222 |
| language | If appropriate | | language | | |
| date created | | | date created | | |
| date last changed | | | Content includes zero or more developer defined attributes<br>name<br>title<br>description<br>Category<br>price | Value<br>"Today's Post"<br>"Blog post for 5/28/05"<br>"humor"<br>"$100" | type<br>string<br>string<br>string<br>number |

| Tag | | | |
|---|---|---|---|
| Users (or applications) can create one or more tags | Desc | Example Value | |
| TAG | | | |
| tag id | Unique ID | 555 | |
| tag word | This is the tag word being used to describe the specific content/app/user | cool | |
| is this a tag of an app, user or content | | content | |
| ID of the item that was tagged | The content ID that was tagged as 'cool' | 444 | |
| created by who (profile_id) | ID of user profile who added this tag | 222 | So in this example the person who owned the app added the content and then tagged their own content as 'cool' |
| tagged by application or our system | | system | |
| date created | | | |
| language | | | |
| date created | | | |
| date last changed | | | |

FIG. 7C

| | |
|---|---|
| ning | Applications \| Users \| Tags \| Type | pivot / RestaurantReview / jane / any / any
68 things found... tag (30), restaurant (25), comment (13)

Hello, Jane Doe
My Account \| Logout

Search for: [____] [GO]

Email This
Report This

POWERED BY NING

Ad1
related to top tags

Ad2
related to top tags

Ad3
related to top tags

Ad4
related to top tags

Tags (contributed by) (30)

apple pie beet soup carrot pudding dessert eggplant falafel goulash italian japanese lunch noodle pizza rhubarb salad soup tag16 tag17 tag18 tag19 tag20 tag21 tag22 tag22 tag23 tag24 tag25 tag26 tag27 tag28 tag29 tag30

Type: restaurant (25)

Cuban
300 Santa Cruz
Added to Restaurant Reviews on 04/11/05 by jane
Popular tags: barbeque, japanese, fun

Chinese Gourmet
400 Bryant St.
Added to Restaurant Reviews on 04/13/05 by jane
Popular tags: chinese, lunch, formal

Gama Sushi
1500 El Camino Real
Added to Restaurant Reviews on 04/07/05 by jane
Popular tags: sushi, japanese more >

Type: comment (13)

Jane says:
Decent food, slow service
Posted on 04/12/05

Jane says:
This is one of the best places to eat in the Bay Area!
Posted on 04/2/05

Jane says:
Great lunch spot!
Posted on 04/11/05 more >

1710

FIG. 17C ning

| | Applications \| Users \| Tags \| Type | pivot / RestaurantReview / any / any / any
782 things found... tag (545), restaurant (125), comment (112)

Tags (for content within) (545)

apple pie beet soup carrot pudding dessert eggplant falafel goulash italian japanese lunch noodle pizza rhubarb salad soup tag16 tag17 tag18 tag19 tag20 tag21 tag22 tag22 tag23 tag24 tag25 tag26 tag27 tag28 tag29 tag30 tag31 tag32 tag33 tag34 tag35 tag36 tag37 tag38 tag39 tag40 tag41 tag42 tag43 tag44 tag45 tag46 tag47 tag48 tag49 tag50

Type: restaurant (125)

German Laundry
350 Ridge Road
Added to Restaurant Reviews on 04/11/05 by frank
Popular tags: french, great, expensive, overrated

---

Chez Pierre
400 Shattuck.
Added to Restaurant Reviews on 04/13/05 by steve
Popular tags: california, great, alice pierre, soup

---

Jardere
200 Grove
Added to Restaurant Reviews on 04/07/05 by may
Popular tags: california, dessert, atmosphere more >

Type: comment (112)

Jane says:
Decent food, slow service
Posted on 04/12/05

---

Al255 says:
This is one of the best places to eat in the Bay Area!
Posted on 04/2/05

---

Hello, Jane Doe
My Account | Logout

Search for:
[        ] GO

Email This
Report This

POWERED BY NING

Ad1
related to tag

Ad2
related to tag

Ad3
related to tag

Ad4
related to tag 1710 brackets the main content section.

FIG. 17D ning      Applications | Users | Tags | Type pivot / any / jane / any / any

155 things found... application (2), tag (226), photo (88), restaurant (55), comment (21)

Applications (owned by or contributed to)    (2)

Family Pics Restaurant Reviews application3 application4 application5 application6

Tags (contributed by)    (226)

apple pie beet soup carrot pudding dessert eggplant falafel goulash italian japanese lunch noodle pizza rhubarb salad soup tag16 tag17 tag18 tag19 tag20 tag21 tag22 tag22 tag23 tag24 tag25 tag26 tag27 tag28 tag29 tag30 tag31 tag32 tag33 tag34 tag35 tag36 tag37 tag38 tag39 tag40 tag41 tag42 tag43 tag44 tag45 tag46 tag47 tag48 tag49 tag50 more >

Type: photo    (88)

PHOTO — Niece and Nephew
Posted by Jane on 04/12/05
Popular tags: cute, silly PHOTO — Mount Ranier
Posted by Jane on 04/03/05
Popular tags: beautiful, ranier PHOTO — Australia Vacation
Posted by Jane on 04/23/05
Popular tags: sydney, diving more >

Type: restaurant    (55)

Hello, Jane Doe
My Account | Logout

Search for: [____] GO

Email This
Report This

POWERED BY NING

Ad1 related to type (if that's possible)

Ad2 related to type

Ad3 related to type

Ad4 related to type

1710

FIG. 17E ning | Applications | Users | Tags | Type pivot / any / any / any / restaurant
607 things found...

Hello, Jane Doe
My Account | Logout

Search for:
[　　　　　] [GO]

Email This
Report This

POWERED BY NING

Type: restaurant (607)

Stuart's
Oak Brook, IL

---

Famous Restaurant in New York
400 University Ave, Berkeley
Added to Restaurant Reviews on 04/11/05 by frank
Popular tags: anything, amazing

---

1710

PHOTO

Bosco's
100 West 52nd street
New York, NY
Rated: 5 stars by 150 people
Tagged: pizza, italian

---

PHOTO

Restaurant from any old App
Posted to Family Pics by Jane on 04/12/05
Popular tags: pizza, recipe

--- more >

Ad1
related to type (if that's possible)

Ad2
related to type

Ad3
related to type

Ad4
related to type

FIG. 17F ning pivot

/ pivot / any / any / any / any http://www.ning.com/pivot/any/any/any/any
pivot | applications | users | tags | types Hello, steve
My Account | Logout Search for: [    ] Go Email This Page
Report This Version 0.1.377alpha
Current Sidebar Focus is:
[Application]
System Generated View for this
[Type]

>> applications in ning (top 50 out of 18)

24HLphotoSharing * Bookmarks * Bookmarksclone * Bookshelf * Hypertextlinks *
NikBulletinBoard * NYCRestaurantReview1 * NYCRestaurantReview3 * PARestReview *
PhotoAlbum * PhotoSharing * potrerohillrestaurants * ProfileTest *
RateHogwartsprofs * RateMyTeachers * System * testone * weblogs >> tags in ning (top 50 out of 165)

24 * beach * blue * blue angels * butterfly * cars * chain * cheap * chinese *
chocolate * code * coffee * cool * corn * critical thinking * cute * design * drink
* expensive * fast * filling * fly * flying * French * funny * great * Hawaii *
italian * king * lola * math * mer * mexican * milpitas * news *
oops * ouch * outer * php * plants * rally * rebar * slashdot * spicy *
Starducks * test * twisted * unix * wow * zajats >> users in ning (top 50 out of 15)

david * dermot * diego * eric * gbianchini * martin * matt * may * jane * nikhyl2 *
peter * pmarca * steve * system * testzero

FIG. 18 ning applications www.ning.com/applications pivot | applications | users | tags | types Hello, steve
My Account | Logout Search for: [____] Go Email This Page
Report This Version 0.1.377alpha
Current Sidebar Focus is:
[Application]
System Generated View for this
[Type]

Applications 1 – 25 of about 18.

Map View | Index View

24HLphotoSharing * Bookmarks * Bookmarksclone * Bookshelf * Hypertextlinks * NikBulletinBoard * NYCRestaurantReview1 * NYCRestaurantReview3 * PARestReview * PhotoAlbum * PhotoSharing * potrerohillrestaurants * ProfileTest * RateStevensprofs * RateMyTeachers * System * testone * weblogs

FIG. 19

Hogwarts Professor Ratings http://www.ning.com/ratestevensprofs/

Home | Departments | Contributors | Tags | My Reviews

Hogwarts Professor Ratings

Hello, steve
My Account | Logout

Search for: [____] Go

Sort by: Most Highly Rated | Most Reviewed | Most Tagged | Most Recently Added

| Teacher | No. of Reviews | Avg. Rating |
|---|---|---|
| Lisa Park<br>Department: Mechanical Engineering<br>First reviewed on 04/29/05 by steve | Add your Rating<br>Popular tags : cute, great | 1 | ★★★★★ |
| Professor Wong<br>Department: Horticulture<br>First reviewed on 04/29/05 by jane | Add your Rating<br>Popular tags : plants | 1 | ★★★★☆ |
| Mark Smith<br>Department: History<br>First reviewed on 04/29/05 by jane | Add your Rating<br>Popular tags : angry, smart | 1 | ★★★★☆ |
| Albus Finn<br>Department: Headmaster<br>First reviewed on 04/29/05 by jane | Add your Rating<br>Popular tags : master | 1 | ★★★★★ |
| Terry White<br>Department: Physics<br>First reviewed on 04/28/05 by steve | Add your Rating<br>Popular tags : cs, ok | 1 | ★★★★★ |
| Ed Carl<br>Department: Mechanical Engineering<br>First reviewed on 04/28/05 by steve | Add your Rating<br>Popular tags : electronics | 1 | ★★★★★ |
| Mr.Gregory<br>Department: Math<br>First reviewed on 04/28/05 by steve | Add your Rating<br>Popular tags : great, math | 1 | ★★★★★ |
| James Ray<br>Department: Debunking<br>First reviewed on 04/18/05 by david | Add your Rating<br>Popular tags : charm, clever, critical thinking | 2 | ★★★★★ |

+ Add A Teacher

<< previous | page 1 of 1 | next >>

RateStevensProfs
Created by david
View Source
Clone this App

NING LINKS what are these?

MY TOP TAGS IN
RATEHOGWARTSPROFS
>> great (2)
>> ok (1)
>> CS (1)
>> cute (1)
>> electronics (1)
>> All of my tags in RateStevensProfs

TOP TAGS IN
RATEHOGWARTSPROFS
>> great (2)
>> ok (1)
>> CS (1)
>> electronics (1)
>> math (1)
>> All tags in RateStevensProfs

TOP USERS IN
RATEHOGWARTSPROFS
>> steve (8)
>> jane (6)
>> david (2)
>> dermot (1)
>> All users in RateStevensProfs Email This page
Report This

FIG. 20A

Hogwarts Professor Ratings

Home | Departments | Contributors | Tags | My Reviews

Hogwarts Professor Ratings

Departments / Mechanical Engineering
2 teachers reviewed in this department.

| Teacher | No. of Reviews | Avg. Rating |
|---|---|---|
| Lisa Park<br>Department: Mechanical Engineering<br>First reviewed on 04/29/05 by steve<br>Popular tags: cute, great | 1 | ★★★★★ |
| Ed Carl<br>Department: Mechanical Engineering<br>First reviewed on 04/28/05 by steve<br>Popular tags: electronics | 1 | ★★★★★ |

<< previous | page 1 of 1 | next >>

Hello, steve
My Account | Logout

Search for: [     ] Go

RateStevensProfs
Created by david
View Source
Clone this App

NING LINKS what are these?

MY TOP TAGS IN RATEHOGWARTSPROFS
>> great (2)
>> ok (1)
>> CS (1)
>> cute (1)
>> electronics (1)
>> All of my tags in RateStevensProfs

TOP TAGS IN RATEHOGWARTSPROFS
>> great (2)
>> ok (1)
>> CS (1)
>> electronics (1)
>> math (1)
>> All tags in RateStevensProfs

TOP USERS IN RATEHOGWARTSPROFS
>> steve (8)
>> jane (6)
>> david (2)
>> dermot (1)
>> All users in RateStevensProfs Email This page
Report This

FIG. 20B http://www.ning.com/photosharing/

Photo Sharing

Home | Contributors | Tags | My Photos | My Albums | My Favorites | My Tags

Hello, steve
My Account | Logout

Photo Sharing
51 public photos in this application. Showing 1-9. >> Upload A New Photo

Sort by: Most Recent | Most Viewed | Most Favorited | Most Comments | Most Tagged << previous | page 1 of 6 | next >>

Search for: [    ] Go

PhotoSharing
Created by peter
View Source
Clone this App

NING LINKS what are these?
MY TOP TAGS IN PHOTOSHARING
>> wow (3)
>> cute (2)
>> mer (2)
>> test (2)
>> corn (1)
>> All of my tags in PhotoSharing

[Photo]

Untitled Photo
0 views | 0 comments
Posted on 05/04/05 by steve

[Photo]

Ning Services
0 views | 0 comments
Tagged 1 times by 1 person
Posted on 04/29/05 by steve

TOP TAGS IN PHOTOSHARING
>> wow (6)
>> beach (4)
>> 24 (3)
>> flying (3)
>> lola (3)
>> All tags in PhotoSharing

[Photo]

Oops again
0 views | 0 comments
Tagged 1 times by 1 person
Posted on 04/29/05 by pmarca

[Photo]

Argument against inbreeding
0 views | 0 comments
Tagged 1 times by 1 person
Posted on 04/29/05 by pmarca

TOP USERS IN PHOTOSHARING
>> steve (23)
>> may (17)
>> pmarca (9)
>> peter (8)
>> gbianchini (7)
>> All users in PhotoSharing Email This page
Report This

FIG. 21

INTERACTING WITH A SHARED DATA MODEL

BACKGROUND OF THE INVENTION

Various web applications allow users to contribute and share content. For example, there are photo sharing applications that allow users to upload and share photos. Blogging applications allow users to post blogs. However, such applications are limited in the scope and type of content they can store and access. For example, a typical photo sharing application can only store images, and/or can only access images owned by the photo sharing application. Similarly, a blogging application can typically only store and access blogs and/or only access blogs from within the blogging application. It would be desirable to have a method for consistently storing and sharing content across multiple applications and/or multiple content types.

BRIEF DESCRIPTION OF THE DRAWINGS

Various embodiments of the invention are disclosed in the following detailed description and the accompanying drawings.

FIGS. 5A-5C illustrates examples of various content attributes associated with various content types.

FIGS. 7A-7C illustrate an example of various data in a shared data model.

FIG. 17C illustrates an embodiment of a system pivot view interface.

FIG. 17D illustrates an embodiment of a system pivot view interface.

FIG. 17E illustrates an embodiment of a system pivot view interface.

FIG. 17F illustrates an embodiment of a system pivot view interface.

FIG. 18 illustrates an embodiment of a system pivot view interface.

FIG. 19 illustrates an example of using the URL as a command line interface.

FIG. 20A illustrates an embodiment of an application.

FIG. 20B illustrates an embodiment of an application.

FIG. 21 illustrates an embodiment of an application.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
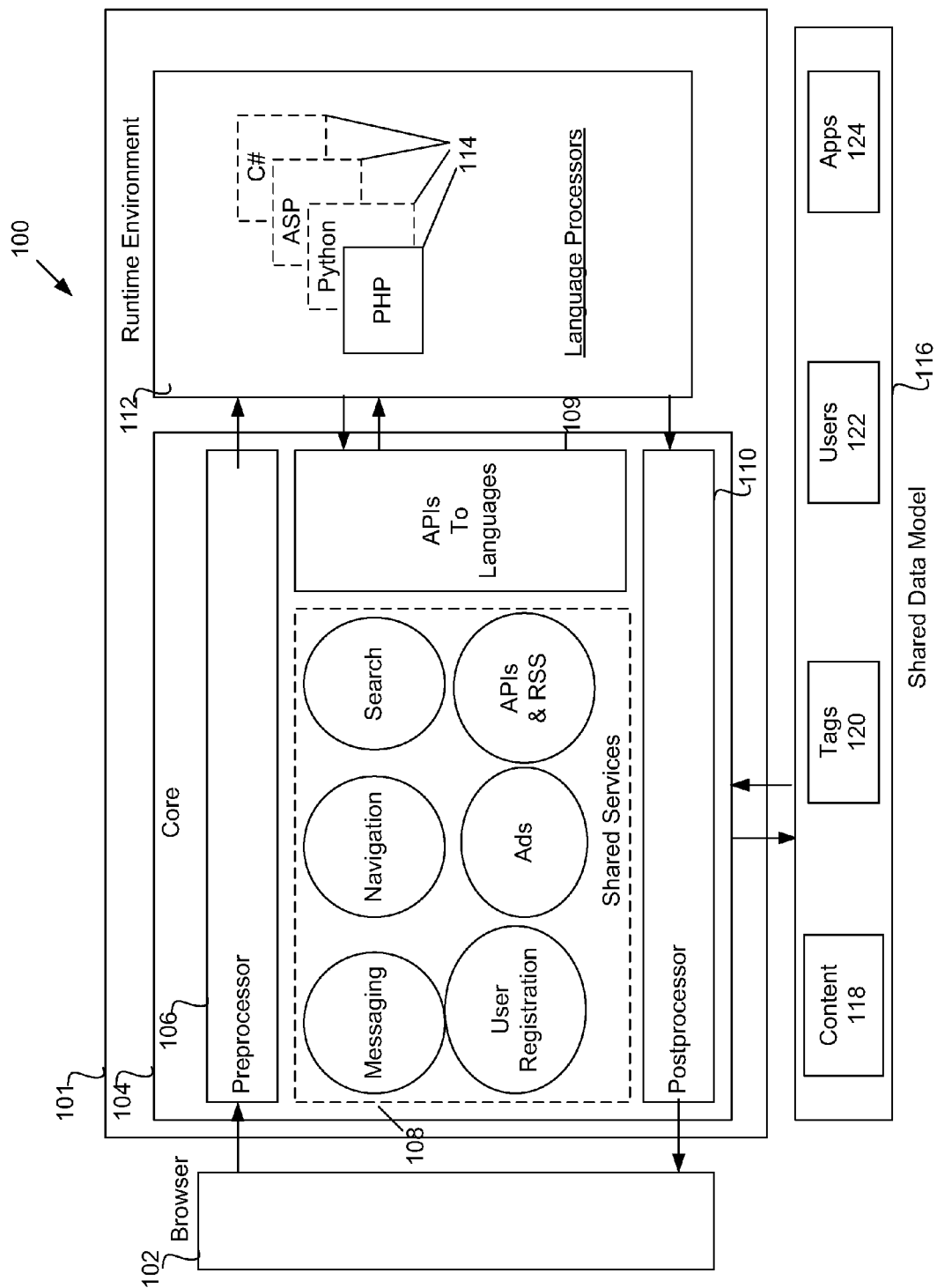
FIG. 1 is a block diagram illustrating an embodiment of a hosted application server.

FIG. 1 is a block diagram illustrating an embodiment of a hosted application server. In the example shown, environment 100 is shown to include hosted application server system 101, browser 102, and shared data model 116. Server system 101 includes core 104 and runtime environment 112. Browser 102 is a web browser or other application capable of viewing data provided over a network, such as the Internet, an intranet or a mobile network.

Core 104 is shown to include preprocessor 106, postprocessor 116, shared services 108, and APIs to languages 109. Preprocessor 106 preprocesses requests from a user at browser 102. For example, preprocessor 106 could include mechanisms for user authentication, security, and session management, as more fully described below. Shared services 108 include various services provided by the host to application developers for use in their applications. For example, shared services 108 could include messaging, navigation, search, user registration, advertising, APIs, and RSS, as more fully described below. Various services not shown could also be provided in various embodiments. For example, external hooks can be provided to other web services such as Amazon, eBay, Google, Visa, Mapquest, etc. APIs 109 can be used to access shared services 108. In some embodiments, core 104 software is written in Java.

Physically, core 104, runtime environment 112, and shared data model 116 can reside on any number of physical devices, each of which can be at any location. In some embodiments, core 104 and runtime environment 112 reside on the same physical device.

Shared data model 116 is a common structure in which data can be stored, shared, and retrieved by multiple applications. Shared data model 116 includes a shared set of data and data types that can be accessed and modified by multiple applications or users. For example, a user or application could add an object to shared data model 116 that can then be accessed by other users and applications. A developer could add a new object type and define attributes associated with that object. That content object type can then be made available to other applications.

Shared data model 116 could include one or more databases or data repositories. Shared data model 116 is shown to include content 118, tags 120, users 122, and applications 124. Examples of content could include photos, comments, reviews, classifieds, or other types of user or application contributed content. Data could be contributed and/or defined by users, applications, or the system. Shared data model 116 could be prepopulated with data. Each object in shared data model 116 can be associated with one or more tags. Objects can be tagged by one or more users. For example, multiple users could tag a particular photo or restaurant review, or a particular application.

Each object can be owned by an application and/or user. In some embodiments, each object is owned by an application and contributed by a user. The owner of an object can designate the object as public or private, where private objects are only provided to the owner or other users designated (e.g., tagged) by the owner (e.g., the owner's friends or family). Each object has a unique object ID in some embodiments.

Various shared services can utilize the data in shared data model 116. For example, a search engine service (e.g., in shared services 108) could be provided that builds an index based on the tags. Advertising can be generated based on tags or content that is retrieved. Profiles can be created based on tag data.

In some embodiments, shared data model 116 includes a SQL database and a search engine that preindexes various queries for faster access to data. In some embodiments, core 104 includes a data access layer for accessing data in shared data model 116.

Runtime environment 112 can run any number of independently written applications. An application can be written in any language that generates HTML, such as PHP, Python, ASP, C#, Java, Javascript, Ruby or .NET or any language that can be used to view information provided over a network (e.g., the Internet, an intranet, a mobile network, or any other type of network). The applications do not all need to be written in the same language. An application includes calls to APIs 109 to access shared services 108.

Any type of application can be developed, any one of which can utilize the set of services and APIs provided by core 104. Examples of applications that could be created include auctions, product reviews, jobs, social networks, alumni networks, etc. Various tools can be provided for application development. For example, wizards, widgets, and example applications can be provided. Widgets could include, for example, listings, user registration, listings, photos, discussions, blogs, reviews, calendars, maps, rankings, ratings, recommendations, reputation, transactions, tagging, etc. Templates could be provided. For example, a marketplace or dating service template could be provided and multiple applications could be independently created based on that template. Tools could be provided for developers of all skill levels. For example, a wizard or a graphical user interface (GUI) could be provided for beginning computer users, and example applications (e.g., showing calls to various APIs and making use of various services) could be provided to amateur developers. APIs for mobile platforms could be provided, including photo, email, and/or SMS upload/download, GPS tracking, and alerts. Documentation, discussion boards, books, evangelism, and support could also be provided to help users create and maintain applications.

Core 104 maintains security between browser 102 and core 104, and between core 104 and runtime environment 112, as more fully described below. Core 104 can be viewed as a proxy between browser 102 and an application running in runtime environment 112. Core 104 authenticates users so that applications running in runtime environment 112 do not need to handle user authentication. Applications can trust users authenticated by core 104, and users can trust applications that are served by server system 101.

Postprocessor 110 postprocesses responses from applications running in runtime environment 112. For example, post processor 110 assembles output from an application with data from shared data model 116. In some embodiments, a web page is assembled and sent to browser 102, where it is displayed. In some embodiments, the output from the application includes instructions written in HTML. The instructions could include XML tags that refer to certain content object IDs and specify how they should be displayed. The content objects could be retrieved from the content database in shared data model 116 and a page could be assembled based on the specification.

Figure 2:
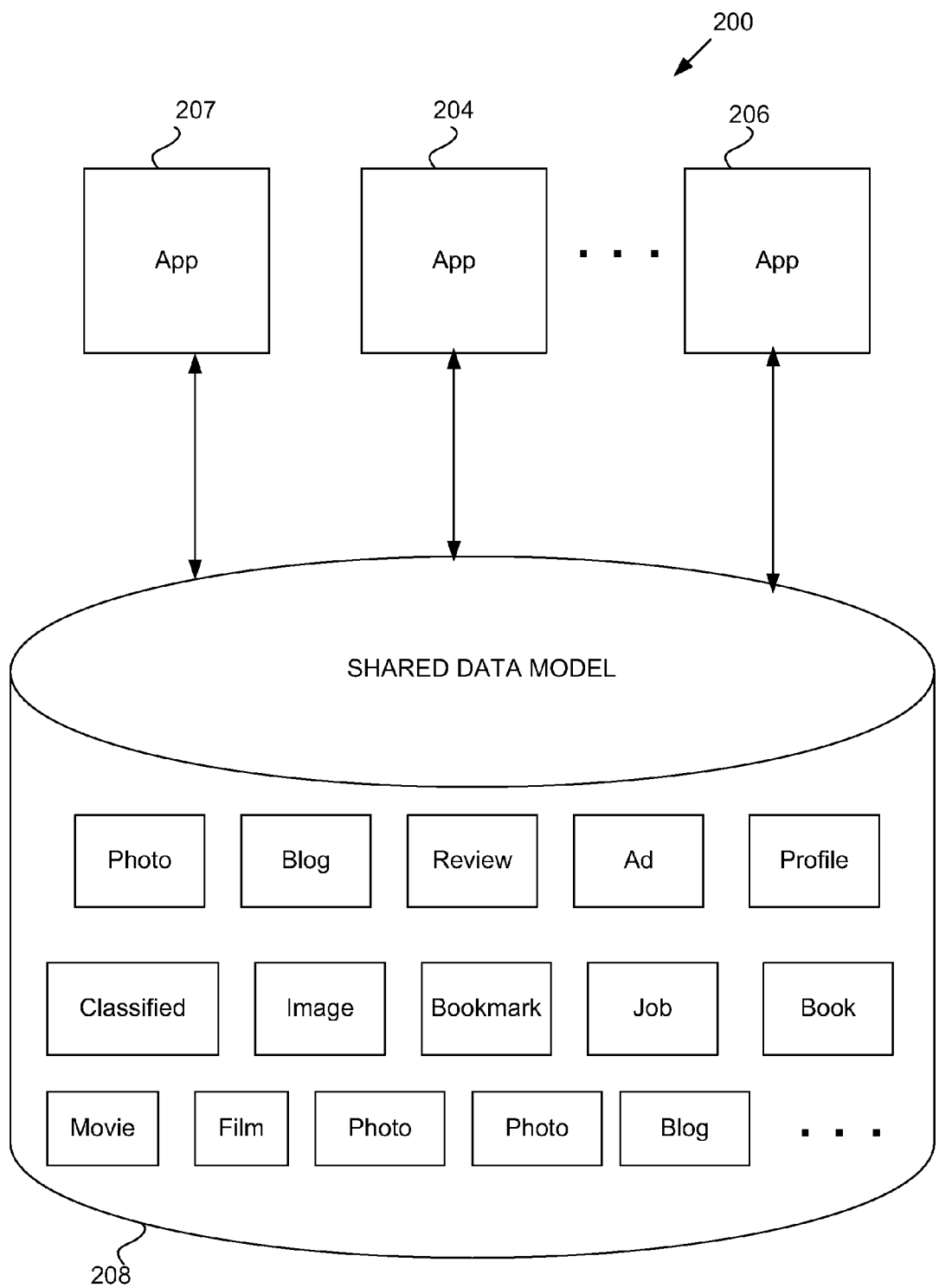
FIG. 2 is a block diagram illustrating an embodiment of a plurality of applications and a shared data model.

FIG. 2 is a block diagram illustrating an embodiment of a plurality of applications and a shared data model. In the example shown, system 200 is shown to include applications 202, 204, and 206 and shared data model 208. Applications 202, 204, and 206 are independently written applications that interact with shared data model 208. In some embodiments, applications 202, 204, and 206 run on a hosted application server system, as shown in FIG. 1. Applications 202, 204, and 206 can contribute to and access content in shared data model 208. Shared data model 208 can be implemented in any appropriate way. In some embodiments, shared data model 208 is implemented in an SQL database.

Shared data model 208 includes a plurality of content objects associated with a plurality of content object types. A content object, as used herein, refers to any structure or object that represents system or user and/or developer contributed content. Content objects can have a content object type (or content type). Content types can include, for example, photo, blog, review, ad, profile, classified, image, bookmark, job, book, movie, film, restaurant, etc. Content types can be system defined or user defined. For example, a developer could define a content type in an application. As a result, there may be multiple content types that might be used to store a photo, for example. For example, suppose "photo" is a system defined content type, and "picture" is a developer defined content type. If application 202 is a photo sharing application and application 204 is an alumni application, both applications might include a feature that allows users to contribute photos. When application 202 receives images, it might store them as content type "photo," whereas application 204 might store received photos as content type "picture." Content types can be shared. For example, the developer of application 204 did not necessarily define the content type "picture."

In some embodiments, a content object type is associated with a set of one or more content attributes. In some embodiments, the content type is one of the content attributes. The system may provide a set of content types and attributes to support images, bookmarks, classified listings, etc. Developers may choose to use these content types or define their own content types. Content types and attributes are more fully described below.

In some embodiments, system 200 includes one application and a plurality of content types. In some embodiments, system 200 includes one content type and a plurality of applications.

In some embodiments, each content object has a type, is owned by an application, is contributed by a user, can be public or private, can be tagged by zero or more users, and/or has a unique content ID. Tagging refers to assigning a string (e.g., one or more words) to an object. The string is referred to as a tag or tag word. Objects that can be tagged include, for example, content objects, users, profiles, and applications. Any application or user can assign a tag. A user can tag an object with any tag word desired.

Content objects can be contributed by a user, the system, or an application in various embodiments. Content objects can be shared across users, applications, and/or systems, including third party systems. Various interfaces can be provided to allow a user, application, or other system to access the content objects. Access could include contributing, modifying, deleting, viewing, searching or tagging content objects. For example, a web services application program interface (API) can be provided to other systems. An API could be provided for requesting RSS content, for example.

Figure 3:
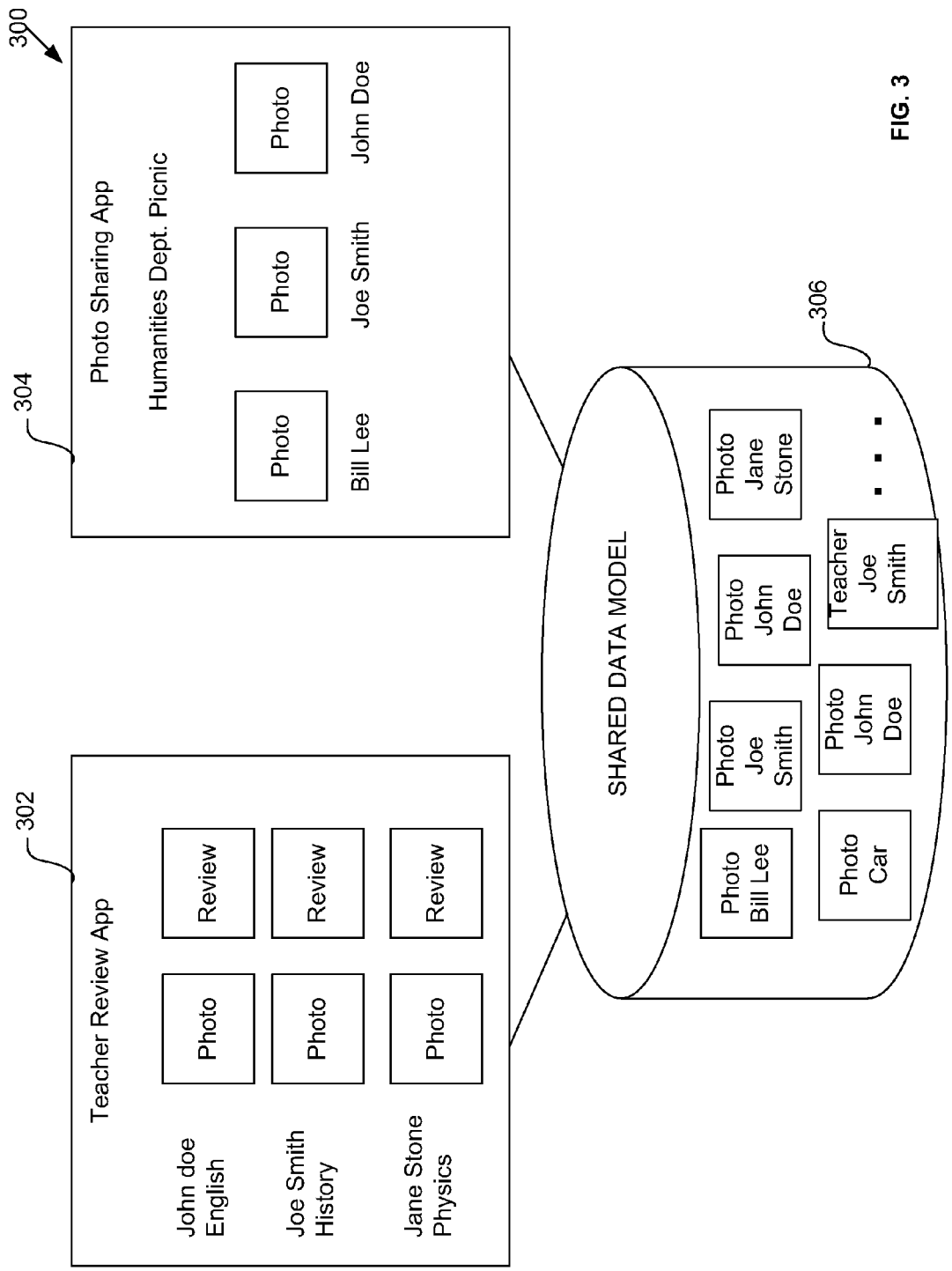
FIG. 3 is a diagram illustrating an example of two applications and a shared data model.

FIG. 3 is a diagram illustrating an example of two applications and a shared data model. In this example, system 300 is shown to include application 302, application 304, and shared data model 306. Application 302 is a teacher review application in which users can submit reviews of various teachers at a particular school. Application 302 includes a list of teachers, and a photo and most recent review of each teacher. The photos are not necessarily contributed by the developer or the users of application 302. The photos are retrieved from shared data model 306.

Application 304 is a photo sharing application, in which users can upload personal photos and display them by event. In the example shown, a display of photos from the Humanities Department picnic is shown. For example, a teacher in the Humanities Department has decided to share his photos using application 304. Application 304 may have been developed by a friend of his, for example. Once the teacher uploads his photos using application 304, the photos are stored in shared data model 306.

Shared data model 306 includes a plurality of content objects of various content types. For example, content objects of (content) type photo, review, and teacher are shown. The reviews contributed using application 302 are stored in shared data model 306. The photos contributed using application 304 are also stored in shared data model 306. Any application can retrieve the reviews and photos from shared data model 306.

In some embodiments, certain content objects are designated as "private" and are not necessarily available to all other applications and/or users. For example, such objects may only be available to certain users and/or certain applications.

In the example of system 300, the user of photo sharing application 304 has uploaded pictures of Bill Lee, Joe Smith, and John Doe into content objects. These names are associated in some way with the content objects. For example, the names of the image files themselves may have the names in embedded them. There could be a "subject" attribute of the photo object that indicates the name of a subject of a photo, if any. Alternatively, a user (either the teacher who contributed the photo) or another user viewing the photo (either using photo sharing application 304 or another application that allows that user access to the photo) could tag the photo object with the name of the person.

Application 302 is shown to display reviews and photos of teachers John Doe, Joe Smith, and Jane Stone. Application 302 can retrieve photos of each of these teachers from shared data model 306 in various ways in various embodiments. In some embodiments, application 302 includes a query for all objects of type photo having a "subject" attribute value of "John Doe". In some embodiments, application 302 includes a query for all objects of type photo tagged "John Doe". In some embodiments, application 302 includes a query for all objects of type photo having any attribute with value "John Doe". In some embodiments, applications 302 and 304 run on a hosted application server system that provides APIs (e.g., in PHP or any other appropriate language) for making such queries.

In some embodiments, a thesaurus feature can be used when submitting queries. For example, when a query for content objects of type photo is submitted, objects of type photo, picture, or image could also be retrieved. In another example, when a query for an object having a tag of "car" is received, the shared data model is searched for objects having a tag of "auto" or "automobile".

In another example, any application can retrieve photos contributed by application 304. For example, a student marketplace application that lists classified advertisements might include a photo of John Doe next to a classified ad for a book required for John Doe's class.

In some embodiments, a content object is displayed by an application according to a view file associated with that object, as more fully described below.

Figure 4:
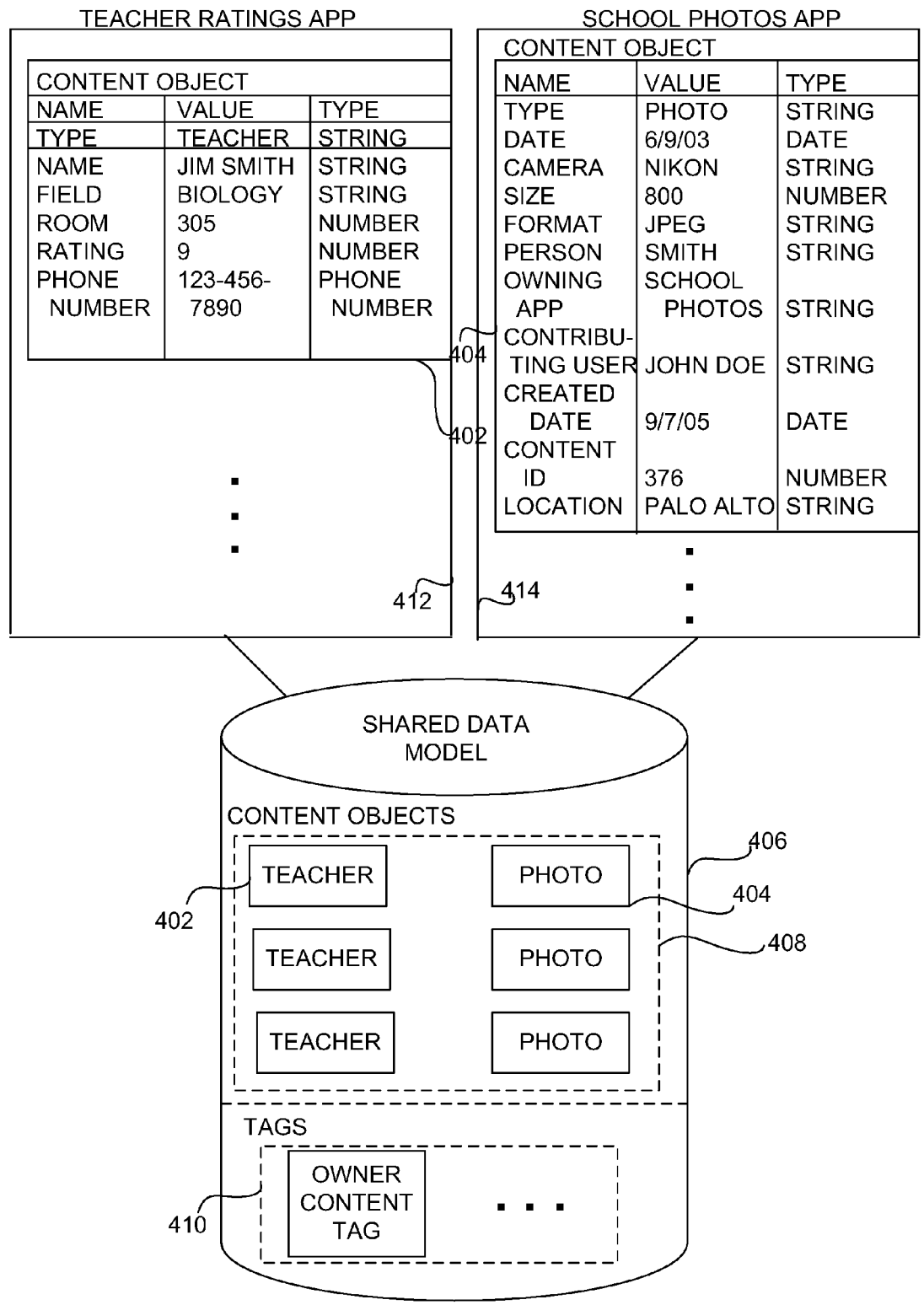
FIG. 4 is a diagram illustrating an example of various objects in a shared data model.

FIG. 4 is a diagram illustrating an example of various objects in a shared data model. Shared data model 406 is shown to include content objects 408 and tags 410. Applications 412 and 414 can access content objects 408. Content objects 408 include content objects of type teacher and content objects of type photo. Content object types can be system defined or developer (or application) defined.

Content object 402 is an example of a content object of type teacher. Content object 402 includes as attributes name, field, room, rating, and phone number in this example. Content attributes can be system defined or application defined, as more fully described below. In some embodiments, content objects are stored in SQL tables and the attributes are column names.

Content object 404 is an example of a content object of type photo. Content object 404 includes as attributes date, camera, size, format, person, content type, owning application, contributing user, created date, content ID, and location. For each attribute, an attribute name, attribute value and attribute type is specified. Attribute type specifies the data type of the attribute value. (Attribute type is different from content type, e.g., in this example, content type is an attribute.) Examples of attribute types include date, string, number, file image, content, URL, etc. For example, one of the attributes has name "size", value "800" and type "number". Specifying attribute types facilitates querying, e.g., based on ranges on numbers. In some embodiments, content object 404 is stored in an SQL table and the content attributes are column names. Any of these attributes can be system defined or application defined. In some embodiments, attributes are stored in a content attribute table. In some embodiments, user defined attributes and/or system defined attributes are stored in separate content attribute table(s).

In some embodiments, shared data model 406 can include content objects 408, tags 410, applications 412 and 414, and users (not shown). Any object (e.g., content objects, tags, applications, users, etc.) in shared data model 406 can be tagged by any application or user. For example, tags 410 is shown to include a tag object having attributes owner, content, and tag. In this example, the owner is the ID of the tagger (e.g., application ID or user ID), the content is a reference to the object being tagged, and the tag is the tag name. Further examples are described more fully below.

FIG. 5A illustrates examples of various content attributes. Content attributes can be assigned by the system, the application, or the user. In this example, table 520 includes examples of system assigned content attributes. Table 522 includes examples of application assigned content attributes.

In this example, content attribute types include string, number, URL, date, content, and file.image. There could be additional content attributes that relate to files added to the system, such as file.image, file.audio, file.MIME. etc. Content attribute names can be system defined or application defined.

FIGS. 5B-5C illustrates examples of various content attributes associated with various content types. Various content object types can be provided by the system. For example, system provided content object types could include bookmark, text, image, classified, personal_profile, product_profile, discussion_post, file, event, comment, etc. Table 524 includes examples of various attributes that could be associated with a content object of type "image", including application (i.e., developer) defined attributes and system provided attributes. Table 526 includes examples of various attributes that could be associated with a content object of type classified, including application (i.e., developer) defined attributes and system provided attributes.

In some embodiments, content objects can be related. For example, one content object can have an attribute with name "related content", value [content ID of related content object], and type "content". In this way, one content object can reference another content object. For example, a photo gallery application might include a set of photo objects (i.e., content object of type "photo") and comment objects that are related. One or more comment objects could reference each photo object. Relationships between content objects can be peer or hierarchical relationships.

Figure 6:
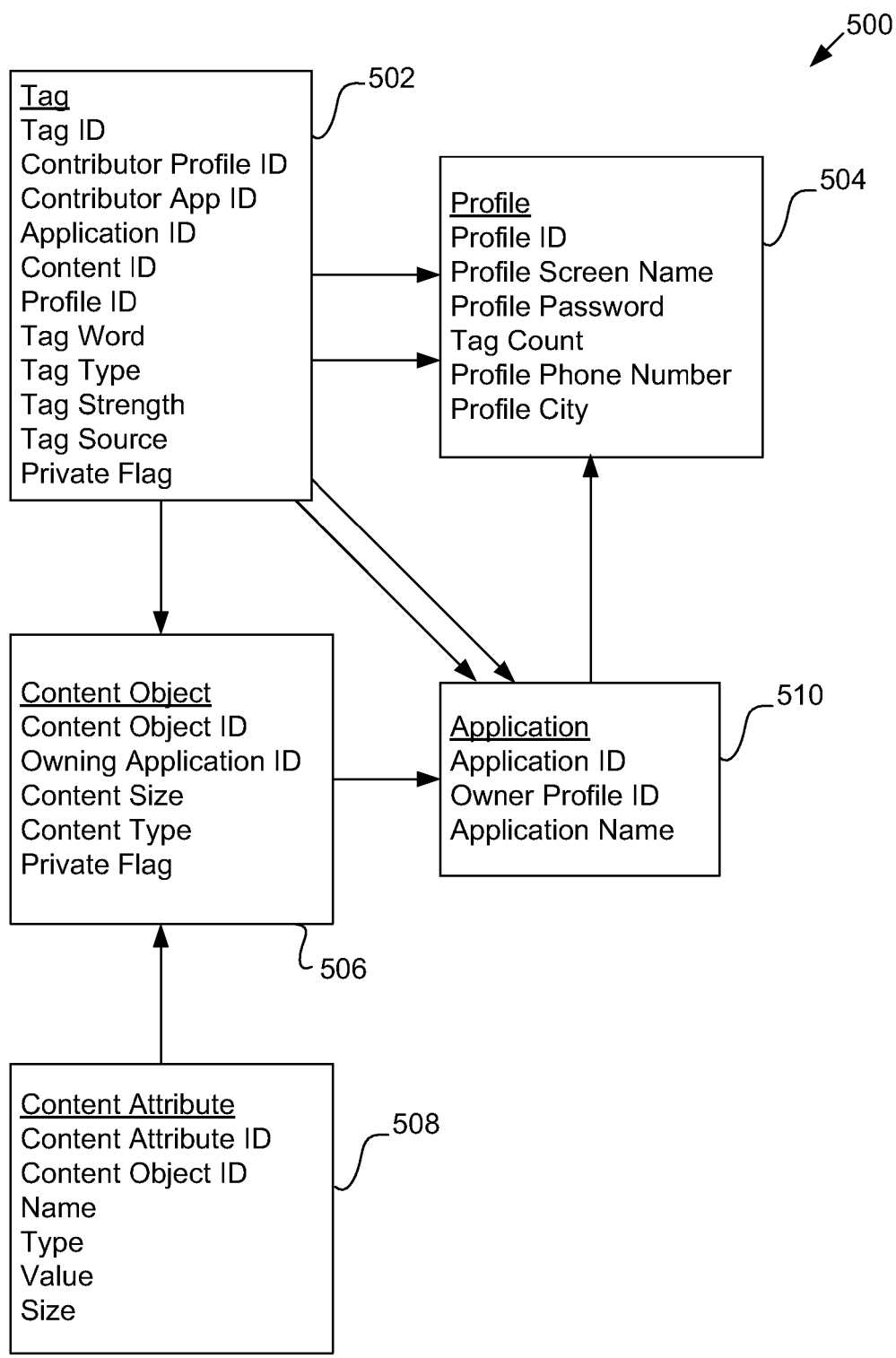
FIG. 6 is a diagram illustrating an example of relationships between objects in a shared data model.

FIG. 6 is a diagram illustrating an example of relationships between objects in a shared data model. In this example, shared structures for tag 502, profile 504, content object 506, content attribute 508, and application 510 are shown. In some embodiments, each structure is a table and each member is a column, e.g., in an SQL database. Any number of other tables could be included in various embodiments.

In some embodiments, a user can have multiple profiles. For example, a user might choose to have a professional and a hobby related profile. Each profile can tag or create an application, user, profile, or content object. Information about each profile is stored in profile table 504. In this example, profile table 504 includes "profile ID", "profile screen name", "profile password", "tag count", "profile phone number", and "profile city" columns. Any other information could also be included in profile table 504.

Information about each application is stored in application table 510. Application table 510 includes "application ID", "owner profile ID", and "application name" columns. "Owner profile ID" is the profile ID of the profile that owns (e.g., created) the application. As such, application 510 references profile table 504, as indicated by the arrow. Any other applicable information can be stored in application table 510.

Information about each tag is stored in tag table 502. In this example, tag table 502 includes "contributor application ID", "contributor profile ID", "application ID", and "content ID" columns. "Contributor application ID" is the application ID of the application that contributed the tag, i.e., the application that the user was using when the tag was created. "Contributor profile ID" is the profile ID of the profile that contributed the tag. "Application ID" is the application ID of the application that is tagged, if applicable. "Content ID" is the content ID of the content that is tagged, if applicable. Thus, tag table 502 can reference application table 510 (twice), content object table 506, and profile table 504, as indicated by the arrows. Other columns in tag table 502 include "tag ID", "tag word", "tag type", "tag strength", "tag source", and "private flag". "Tag word" is the word used for the tag. "Tag source" indicates whether the tag was created by a profile or an application. "Tag strength" is a score (e.g., 1-5) indicating the strength or importance of this tag to the person tagging it. For example, a poor quality image might have a lower tag strength than a high quality image has. "Tag source" indicates whether the tag was contributed by a user using an application or using a sidebar. Sidebars are more fully described below. "Private flag" indicates whether the content object is private and only available to a particular profile(s), user(s), and/or application (s). Any other columns can be included in tag table 502.

Information about each content object is stored in content object table 506. Content object table 506 includes an "owning application ID" column. "Owning application ID" is the application ID of the application that contributed the content object. Thus, content object table 506 references application table 510, as indicated by the arrow. In some embodiments, a user or a profile can own (i.e., create) a content object. In this case, content object table 506 might include a column called "owning user ID" or "owning profile ID". Content object table 506 also includes "content object ID", "content size", "content type", "content title", and "private flag" columns. "Content size" is the size of the content object, e.g., if the content object is an image, the size of the image. "Content type" is the type of content, such as "book" or "photo". "Private flag" indicates whether the content object is private and only available to a particular profile(s), user(s), and/or application(s).

A content object can have one or more content attributes. For example, a content object of type "book" might have content attributes "publisher", "edition", and/or "list price". Information about each content attribute is stored in content object table 508. Content attribute table 508 includes a "content object ID" column. "Content object ID" is the content object ID of the content object associated with the attribute. Thus, content attribute table 508 references content object table 506, as indicated by the arrow. Content attribute table 508 also includes "content attribute ID", "name", "type", "value", and size columns. "Name" is the name of the attribute, such as "publisher" or "price". "Type" is the data type of the attribute, such as "string", "number" or "price". "Value" is the value of the attribute, such as "Publisher X" or "$19.95". Size is the amount of storage used by the attribute value. For example, if the attribute name is "picture" and the type is "image" or "jpeg", then size would be the size of the image file.

In some embodiments, an interface could be provided for accessing various objects in the shared data model. For example, the interface could include a way to specify a tag word, profile name, application name, content object type and/or one or more content attribute names and values, as more fully described below. For example, a developer (e.g., using a query API) or a user (e.g., using a user interface (UI), such as a GUI) could specify the following information: tag word "flower", profile name "bob", application name "any", content type "photo", content size "<100 KB", content attribute name "camera" with content attribute value "Canon", and content attribute name "created date" with content attribute value "9-17-2004". In some embodiments, the URL can be used as command line interface (CLI) for making a query. For example, a user could specify in a URL: "http://www.ning.com/pivot/any/bob/flower/photo?&camera=Canon&date=9-17-2004/size<100 KB", where "http://www.ning.com" is a hosted application server system on which the application runs. A system provided application ("pivot") then displays a list of content objects of type "monster", as more fully described below.

Content objects in shared data model 500 can be of any type, contributed by any application, user and/or profile. Each content object can be associated with any number of tags, i.e., multiple users can tag a content object and/or a single user can tag a content object multiple times with different tags. A search engine can be provided and an index built based on the tags.

FIGS. 7A-7C illustrate an example of various data in a shared data model. In this example, FIG. 7A is shown to include user information 602 and profile information 604. FIG. 7B is shown to include application information 606 and content information 608. FIG. 7C is shown to include tag information 610. In some embodiments, the above information is included in a user table, profile table, application table, and content object table in a shared data model. For example, user information 602 could be contained in a row of a user table in a shared data model.

In some embodiments, there is one registered user per confirmed email address. In the example shown, user information 602 is shown to include registered user ID 111. User information 602 could also include the date the user ID was created, the date the user ID was last changed, or any other information as appropriate.

In some embodiments, each registered user can have one or more profiles. Profile information 604 is shown to include profile ID 222 and registered user ID 111. This profile was created by the user with user ID 111. Profile information 604 could also include a profile screen name, email ID, preferred language, date created, date last changed, or any other information as appropriate.

In some embodiments, each user profile can create one or more applications. Application information 606 is shown to include application ID 333 and creator profile ID 222. This application was created by the profile with profile ID 222. Application information 606 could also include an application name, an application URL, an application location on disk, which language the application uses, date created, and date last changed. For example, the application URL could be a string that is entered in the URL to access the application, e.g., "http://www.ning.com/cityblog", where "http://www.ning.com" is a hosted application server system on which the application runs.

In some embodiments, each application can own (i.e., contribute) one or more content objects. Content object information 608 is shown to include content ID 444, owning application ID 333, and originating profile ID 222. This content object was created by a user under profile ID 222 using application 333. Content object information 608 could also include content type, private content, which language the content object uses, date created, date last changed, and any other information as appropriate. In this example, content object having content ID 444 is a blog that is private to the application with application ID 333.

In some embodiments, a content object can include zero or more developer defined attributes. These attributes can be defined by user ID 111, profile ID 222, or any other user and/or profile. In this example, a developer has defined four attributes: title, description, category, and price, as shown.

In some embodiments, users or applications can create one or more tags. Tag information 610 is shown to include tag ID 555, the tag word, the content ID of the item that was tagged, and the profile ID of the profile that created this tag. This tag is a tag on content ID 444 created by profile ID 222. In this example, the owner of the application 333 added content object 444, and then tagged the content object as "cool". Tag information 610 could also include an indication of whether the tag is of an application, user (or profile), or content, an indication of whether the tag was tagged by an application or the system, date created, language, date last changed, or any other information as appropriate.

Figure 8:
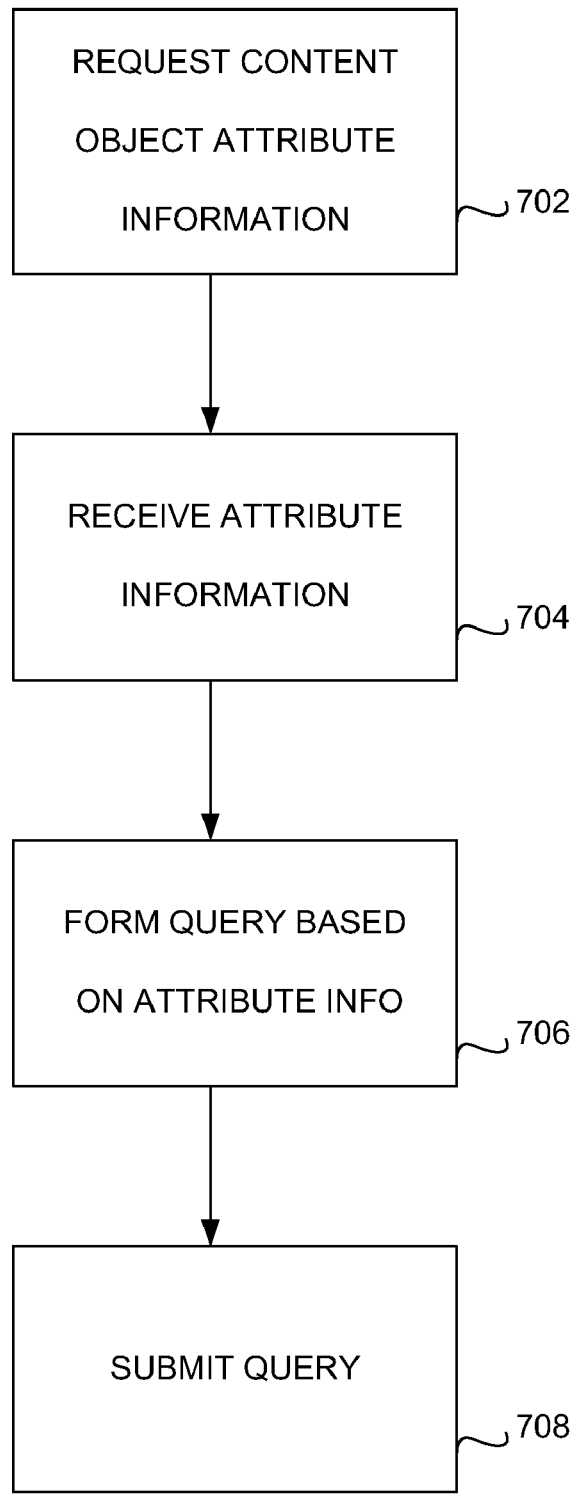
FIG. 8 is a flowchart illustrating an embodiment of a process for submitting a query.

FIG. 8 is a flowchart illustrating an embodiment of a process for submitting a query. In this example, a query is submitted based on an application (i.e., developer) defined content type. For example, suppose a developer Bob defines a content object of type "monster" with content object attributes "color", "diet", "number_of_arms", and "picture" in an application "bob_app". Another developer Jim may choose to include some information about monsters in his application "jim_photos". Jim might first determine whether there are any content objects of type "monster" in the shared data model. For example, "http://www.ning.com/pivot/any/any/any/monster" could be entered in the URL. In some embodiments, this causes a system provided application to display a list of content objects of type "monster". If there are content objects of type "monster" returned, Jim may decide to leverage the existing content objects of type "monster" to display monster information in his application. In some embodiments, Jim first "introspects" the content type "monster". Introspecting refers to discovering information about the content object, e.g., so that a query can be formed based on the information.

At 702, information associated with a content object attribute is requested. For example, an API may be used to request information about a content object for a content object of type "monster". At 704, attribute information is received. For example, the following information could be returned (for example, in an array):

| Attribute Name | Attribute Value | Attribute Type |
|---|---|---|
| content type | monster | string |
| private | yes | string |
| color | blue | string |
| diet | grass | string |
| number_of_arms | 5 | number |
| picture | bluemonster.jpg | file.image |

In this example, the content type itself is an attribute of the content object. In some embodiments, all content objects also have system assigned content attributes (e.g., content_detail_id, app_id, etc. as described above), which are not shown here.

In some embodiments, the developer could submit a request for the structure of an object of type "monster". The structure of the content object includes the attribute names and types associated with the content object. In this case, only the attribute names and attribute types are returned.

At 706, a query is formed based on the attribute information. For example, the developer may decide to display images of monsters with more than three arms in his application. The developer could then specify in the query that "number_of_arms" is greater than three. An API may be provided for the developer to specify and submit such a request. At 708, the query is submitted. For example, the query may be submitted in the application using an API and the results displayed to a user viewing the application.

In some embodiments, a user could view all monsters with more than three arms by entering in the URL an appropriate command, e.g., http://www.ning.com/pivot/any/any/any/monster?number_of_arms>2".

The developer (e.g., Jim) may then decide to display monsters with more than three legs. In some embodiments, the developer could create another content object type called "my_monster" with a content object attribute "number_of_legs". The developer and/or other users could then contribute content objects of type "my_monster".

In some embodiments, an application can add an attribute to an existing content object that is not necessarily owned by the application. For example, the content object of type "monster" was defined by "bob_app". Application "jim_photos" could add the attribute "number_of_legs" to the content object of type "monster". The attributes associated with the content type "monster" would now include:

| Attribute Name | Attribute Type |
|---|---|
| content type | string |
| private | string |
| color | string |
| diet | string |
| number_of_arms | number |
| picture | file.image |
| number_of_legs | number |

The application "jim_photos", other applications, and/or users could then fill in the attribute value "number_of_legs" for this content object, as well as contribute content objects of type "monster" with attribute "number_of_legs".

In some embodiments, a developer can create a view file for use when displaying a content object. View files are more fully described below. For example, Jim could create a view file that specifies how to display the new attribute "number_of_legs". The view file could be used by application "jim_app" or by any other application written by any other developers.

Any number of attributes can be added or provided by the system and/or by any application. For example, the content object of type "monster" that was originally defined by application "bob_app" could eventually include multiple attributes defined by multiple sources. For example, the attributes associated with the content type "monster" could include the following:

| Attribute Name | Example Attribute Value | Attribute Type | Attribute Defined By |
|---|---|---|---|
| content type | monster | string | system |
| private | yes | string | system |
| color | blue | string | bob_app |
| diet | grass | string | bob_app |
| number_of_arms | 5 | number | bob_app |
| picture | thismonster.jpg | file.image | bob_app |
| number_of_legs | 3 | number | jim_photos |
| number_of_heads | 2 | number | jim_photos |
| gender | male | string | lisa_humor |
| species | 217 | content | lisa_humor |
| photo | 481 | content | mike_blog |

In this example, application "bob_app" defined additional attributes on top of the system defined attributes. Application "jim_photos" defined additional attributes on top of the system and bob_app defined attributes. Similarly, applications "lisa_humor" and "mike_blog" defined additional attributes.

In this example, the attribute "species" has as attribute value 217, the content object ID of another content object. Content object 217 could have type "species_profile", which has attributes describing information about this species (e.g., "scientific name", "height_range", "common_colors", etc.).

The attribute "photo" has as attribute value 481, the content object ID of another content object. Content object 481 could have type "photo", which has an attribute that points to an image of the monster. As such, there are two ways to include images of this monster—by using attribute "picture", which points directly to an image file, or by using attribute "photo", which points to a content object of type "photo".

Hosted Application Server System

A hosted application server running multiple applications provided by multiple users is disclosed. In some embodiments, the hosted application server provides a secure interface between users and applications, where varying levels of trust between various users and applications can be designated and handled. In some embodiments, the hosted application server includes a shared data model that includes content provided by multiple users. The data in the shared data model can be made available to multiple applications and multiple users.

Figure 9:
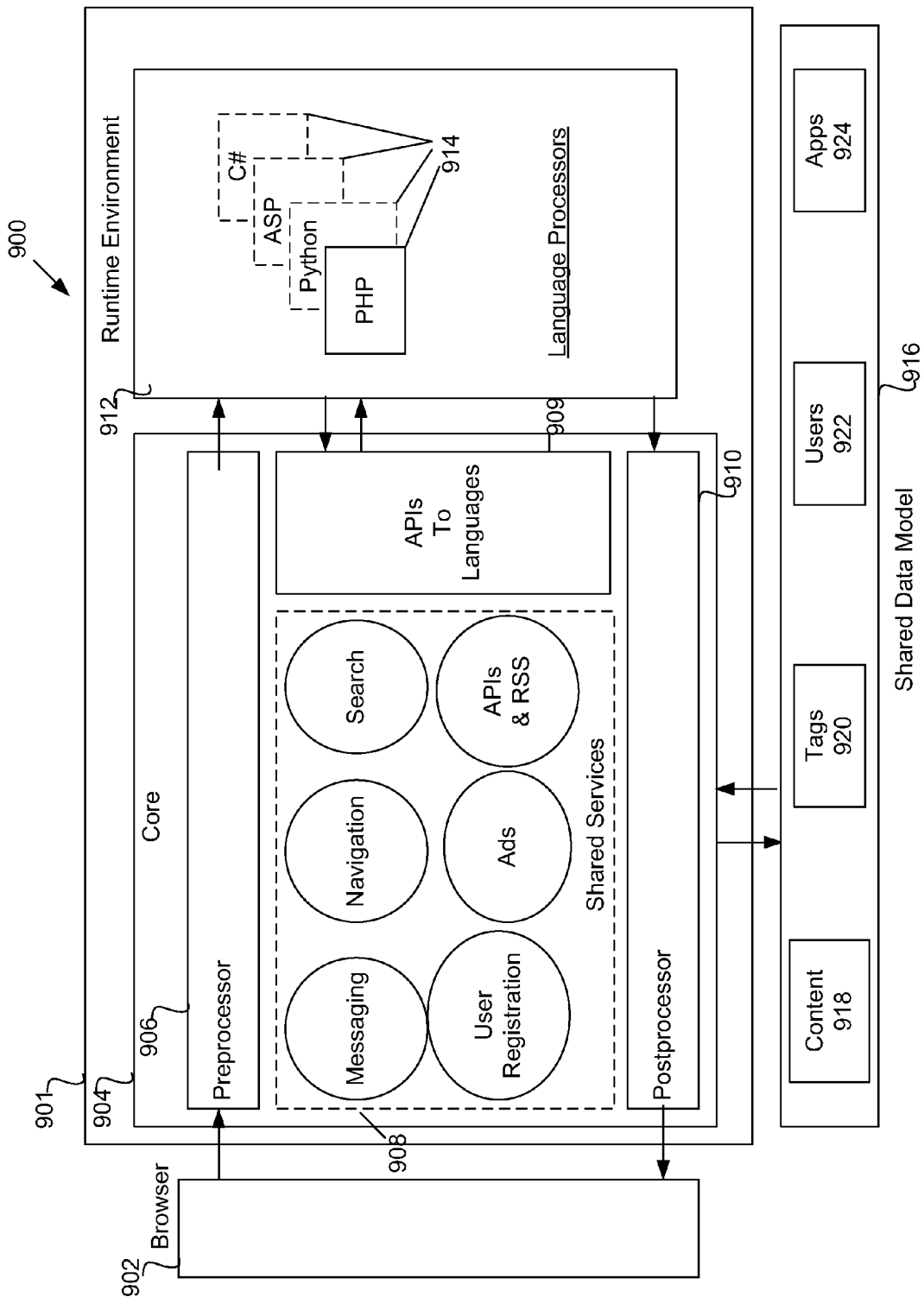
FIG. 9 is a block diagram illustrating an embodiment of a hosted application server.

FIG. 9 is a block diagram illustrating an embodiment of a hosted application server. In the example shown, environment 900 is shown to include hosted application server system 901, browser 902, and shared data model 916. Server system 901 includes core 904 and runtime environment 912. Browser 902 is a web browser or other application capable of viewing data provided over a network, such as the Internet, an intranet or a mobile network.

Core 904 is shown to include preprocessor 906, postprocessor 116, shared services 908, and APIs to languages 909. Preprocessor 906 preprocesses requests from a user at browser 902. For example, preprocessor 906 could include mechanisms for user authentication, security, and session management, as more fully described below. Shared services 908 include various services provided by the host to application developers for use in their applications. For example, shared services 908 could include messaging, navigation, search, user registration, advertising, APIs, and RSS, as more fully described below. Various services not shown could also be provided in various embodiments. For example, external hooks can be provided to other web services such as Amazon, eBay, Google, Visa, Mapquest, etc. APIs 909 can be used to access shared services 908. In some embodiments, core 9104 software is written in Java.

Physically, core 904, runtime environment 912, and shared data model 916 can reside on any number of physical devices, each of which can be at any location. In some embodiments, core 904 and runtime environment 912 reside on the same physical device.

Shared data model 916 is a common structure in which data can be stored, shared, and retrieved by multiple applications. Shared data model 916 includes a shared set of data and data types that can be accessed and modified by multiple applications or users. For example, a user or application could add an object to shared data model 916 that can then be accessed by other users and applications. A developer could add a new object type and define attributes associated with that object. That content object type can then be made available to other applications.

Shared data model 916 could include one or more databases or data repositories. Shared data model 916 is shown to include content 918, tags 920, users 922, and applications 924. Examples of content could include photos, comments, reviews, classifieds, or other types of user or application contributed content. Data could be contributed and/or defined by users, applications, or the system. Shared data model 916 could be prepopulated with data. Each object in shared data model 916 can be associated with one or more tags. Objects can be tagged by one or more users. For example, multiple users could tag a particular photo or restaurant review, or a particular application.

Each object can be owned by an application and/or user. In some embodiments, each object is owned by an application and contributed by a user. The owner of an object can designate the object as public or private, where private objects are only provided to the owner or other users designated (e.g., tagged) by the owner (e.g., the owner's friends or family). Each object has a unique object ID in some embodiments.

Various shared services can utilize the data in shared data model 916. For example, a search engine service (e.g., in shared services 908) could be provided that builds an index based on the tags. Advertising can be generated based on tags or content that is retrieved. Profiles can be created based on tag data.

In some embodiments, shared data model 916 includes a SQL database and a search engine that preindexes various queries for faster access to data. In some embodiments, core 904 includes a data access layer for accessing data in shared data model 916.

Runtime environment 912 can run any number of independently written applications. An application can be written in any language that generates HTML, such as PHP, Python, ASP, C#, Java, Javascript, Ruby or .NET or any language that can be used to view information provided over a network (e.g., the Internet, an intranet, a mobile network, or any other type of network). The applications do not all need to be written in the same language. An application includes calls to APIs 909 to access shared services 908.

Any type of application can be developed, any one of which can utilize the set of services and APIs provided by core 904. Examples of applications that could be created include auctions, product reviews, jobs, social networks, alumni networks, etc. Various tools can be provided for application development. For example, wizards, widgets, and example applications can be provided. Widgets could include, for example, listings, user registration, listings, photos, discussions, blogs, reviews, calendars, maps, rankings, ratings, recommendations, reputation, transactions, tagging, etc. Templates could be provided. For example, a marketplace or dating service template could be provided and multiple applications could be independently created based on that template. Tools could be provided for developers of all skill levels. For example, a wizard or a GUI could be provided for beginning computer users, and example applications (e.g., showing calls to various APIs and making use of various services) could be provided to amateur developers. APIs for mobile platforms could be provided, including photo, email, and/or SMS upload/download, GPS tracking, and alerts. Documentation, discussion boards, books, evangelism, and support could also be provided to help users create and maintain applications.

Core 904 maintains security between browser 902 and core 904, and between core 904 and runtime environment 912, as more fully described below. Core 104 can be viewed as a proxy between browser 902 and an application running in runtime environment 912. Core 904 authenticates users so that applications running in runtime environment 912 do not need to handle user authentication. Applications can trust users authenticated by core 904, and users can trust applications that are served by server system 901.

Postprocessor 910 postprocesses responses from applications running in runtime environment 912. For example, post processor 910 assembles output from an application with data from shared data model 916. In some embodiments, a web page is assembled and sent to browser 902, where it is displayed. In some embodiments, the output from the application includes instructions written in HTML. The instructions could include XML tags that refer to certain content object IDs and specify how they should be displayed. The content objects could be retrieved from the content database in shared data model 916 and a page could be assembled based on the specification.

Figure 10:
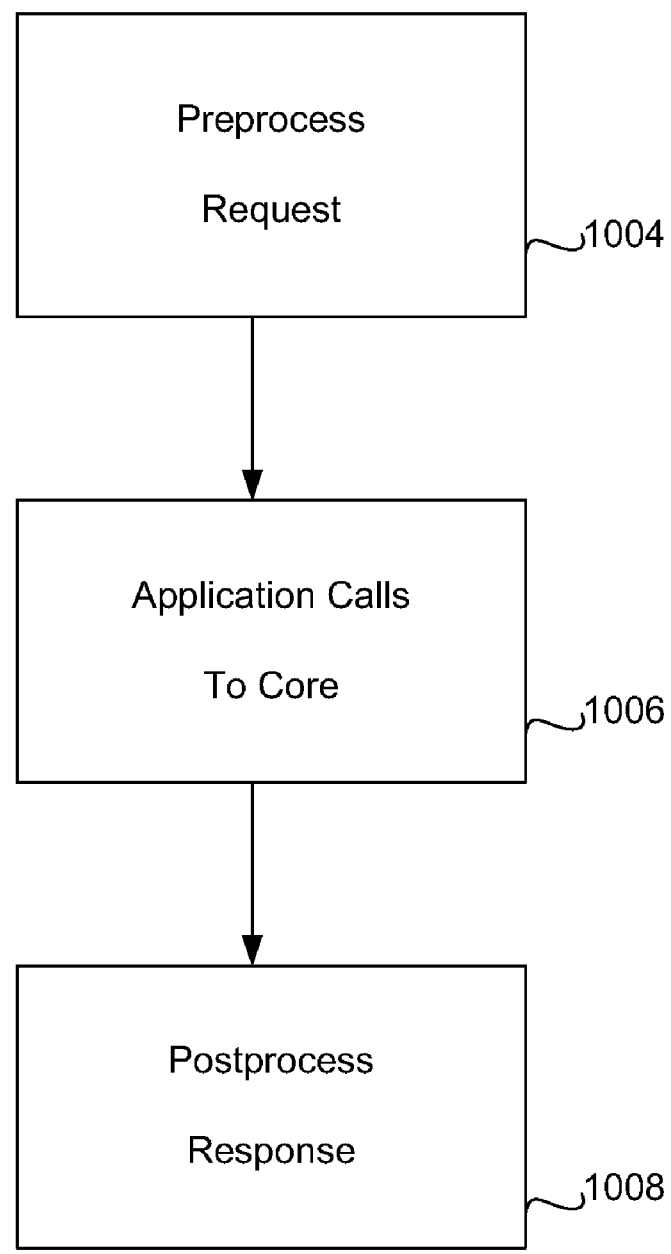
FIG. 10 is a flowchart illustrating an embodiment of a process for handling a user request.

FIG. 10 is a flowchart illustrating an embodiment of a process for handling a user request. In some embodiments, this process is implemented on core 1004 when a request to access an application is made (e.g., a user enters the URL associated with the application). In the example shown, the process begins at 1004, in which a request is preprocessed. Preprocessing could include, for example, authenticating the request or performing other security related functions. In some embodiments, 1004 is performed by preprocessor 906 in environment 900. At 1006, application calls to the core are handled. For example, runtime environment 912 executes the application code, which could include calls back to the server, e.g., to retrieve data from shared data model 916. At 1008, the response is postprocessed. A response is received from an application and interpreted. For example, XML tags are received, and data is retrieved from the database based on the tags. HTML is generated that includes the data, and the page is delivered to the user. In some embodiments, 1008 is performed by postprocessor 910 in environment 900. These processes are more fully described below.

Figure 11A:
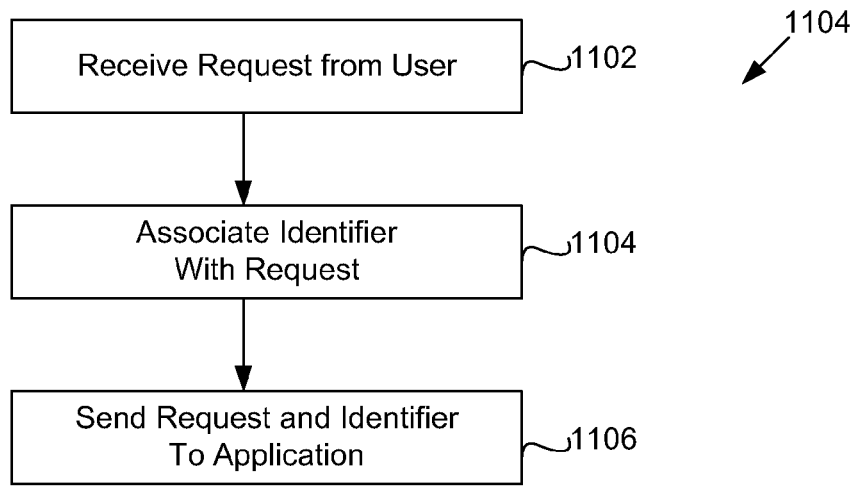
FIG. 11A is a flowchart illustrating an embodiment of a process for preprocessing a user request.

FIG. 11A is a flowchart illustrating an embodiment of a process for preprocessing a user request. In some embodiments, this process is implemented on preprocessor 906. In the example shown, the process begins at 1102, in which a request is received from a user. For example, the request could include the URL associated with the application. A username and a password could also be included. In some embodiments, the username could be anonymous or guest. In some embodiments, when the user does not enter a username, the request is handled as if the user was anonymous. At 1104, an identifier is associated with the request. The identifier can be based on the application and/or the username. In some embodiments, the user is authenticated and an identifier, such as a security token, is generated for the request. For example, the identifier could be a random number or a hash value. In some embodiments, the lifetime of the security token is one page request. In some embodiments, a security certificate, an identifier associated with the location of the user, such as an IP address, or other identifier is associated with the session. In some embodiments, for each identifier, the username, application, and/or role of that user are stored. Examples of roles include guest, user, or administrator. At 1106, the request and identifier are sent to the application. The username and/or role could also be sent to the application for use by the application. The server could store the identifier, username, and role in a lookup table (e.g., in RAM).

Figure 11B:
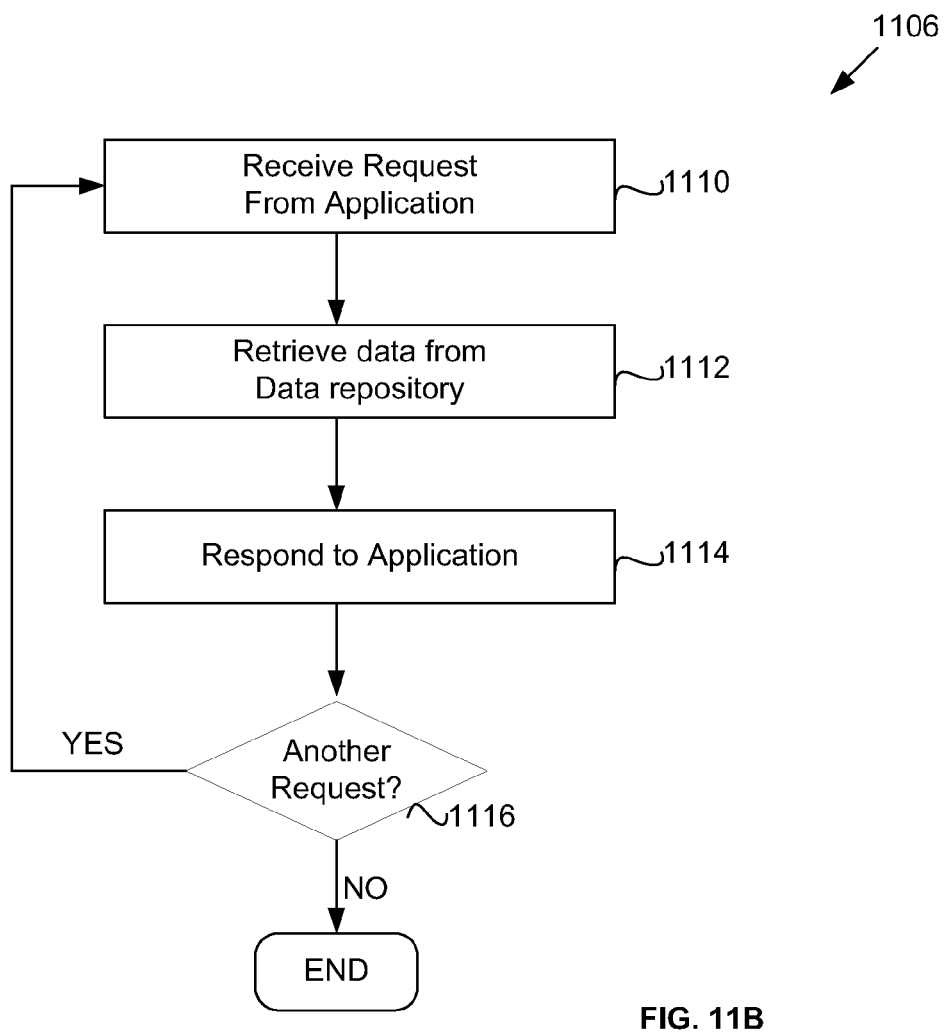
FIG. 11B is a flowchart illustrating an embodiment of a process for handling application requests at a core.

FIG. 11B is a flowchart illustrating an embodiment of a process for handling application requests at a core. In some embodiments, this process is implemented on core 904 when requests are received from an application running in runtime environment 912. In the example shown, the process begins at 1110, in which a request is received from the application. In some embodiments, the request includes the identifier that was sent to the application at 1106. As such, the server can check the identifier to authenticate the request. The request could be delivered using any appropriate network API, such as SOAP. At 1112, depending on the request, data could be retrieved from the shared data model. For example, the request could be a request for all content objects tagged "cat" or all photos (i.e., content objects of type "photo") tagged "cat". At 1112, objects are retrieved to satisfy the request. In some embodiments, only content objects that are public or private, but available to that user (as determined by the identifier included in the request), are retrieved. If the user is an anonymous user, only public objects matching the request are retrieved. At 1114, a response is sent to the application. For example, all content objects tagged "cat" are sent to the application. The request could be delivered using any network API. At 1116, if another request is received, the process returns to 1110. Otherwise, the process ends.

Figure 11C:
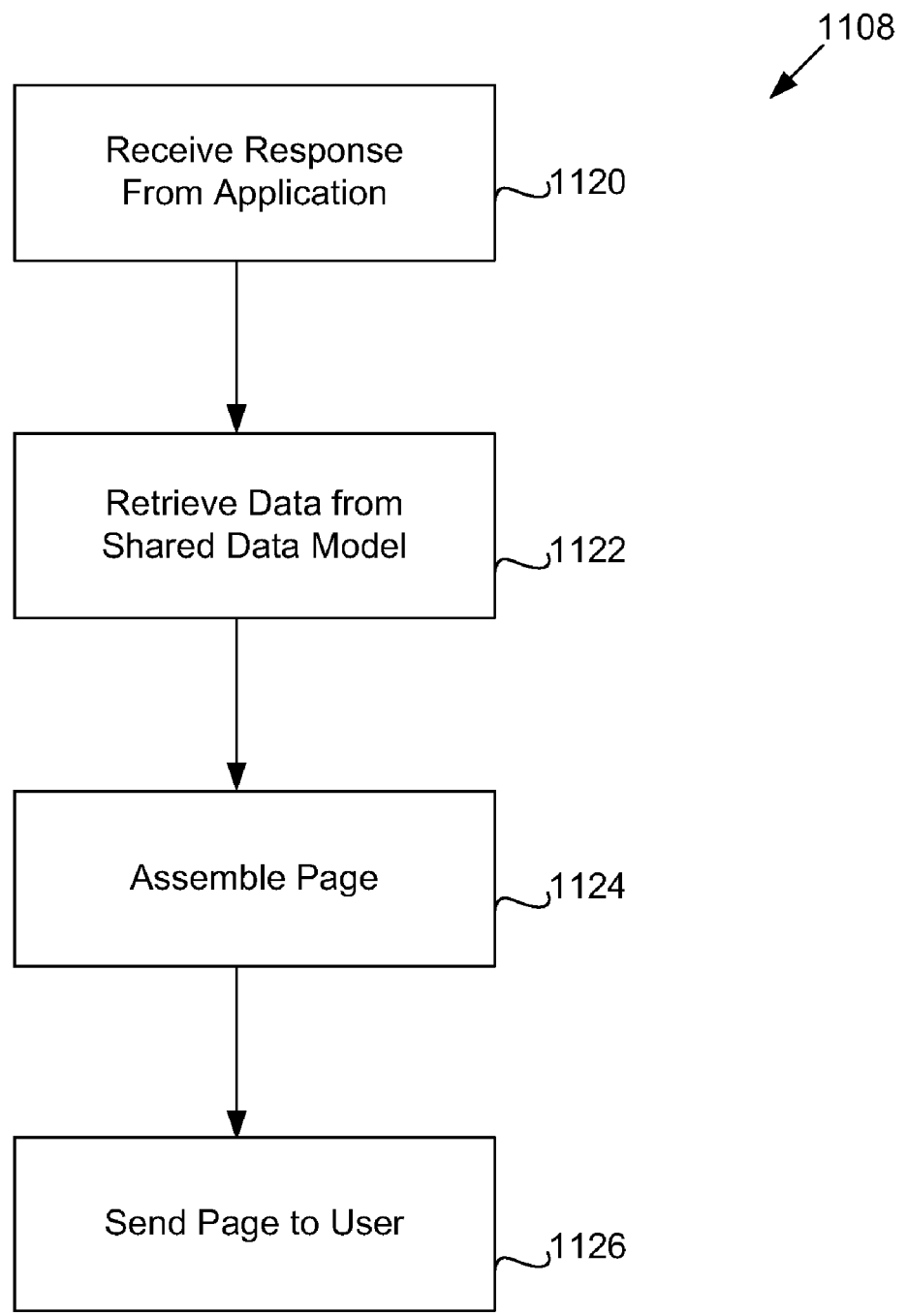
FIG. 11C is a flowchart illustrating an embodiment of a process for postprocessing a response from an application.

FIG. 11C is a flowchart illustrating an embodiment of a process for postprocessing a response from an application. In some embodiments, this process is implemented on postprocessor 910 when a response from an application running in runtime environment 912 is received. In the example shown, the process begins at 1120, in which a response is received from the application. In some embodiments, the response includes the identifier that was received from the server at 1106. As such, the server can check the identifier to authenticate the response. The response can include object IDs to refer to objects in shared data model 916 and a description of how to display them. At 1122, depending on the response, data is retrieved from the shared data model. For example, the response could include a list of object IDs, in which case the objects with those object IDs are retrieved. At 1124, a page is assembled based on the response. The page could be formatted for display in a web browser or any other application capable of viewing data provided over a network, such as the Internet, an intranet or a mobile network. The page could include an HTML, XML, PDF, MP3, mobile, or any other type of file.

In some embodiments, an application can reference a view file that describes how an object should be displayed. The view file can be included in the response at 1122. In some embodiments, the view file is written in HTML and/or XML. An object can be associated with multiple view files contributed by multiple developers. For example, a developer might create for a particular object a view file to display the object in a small or large area. For example, a developer could create an object of type restaurant review with attributes "name", "image", "review", and "url". The view file could specify that that the image of the restaurant be displayed on a first line, the restaurant name be displayed on a second line, and the review be displayed on a third line. The view file could specify that selecting (e.g., using a mouse to click on) the name of the restaurant would lead to the website of the restaurant. In some embodiments, a view file is retrieved from the application that owns the object to be displayed. In some embodiments, a view file is retrieved from a registry of publicly available view files. Developers can contribute view files to the registry. In some embodiments, if there is no description (e.g., a view file) specified, the objects are displayed according to a default description (e.g., a default view file).

In some embodiments, only content objects that are public, or private but available to the particular user and/or application (as determined by the identifier included in the response), are retrieved. For example, if a content object having object ID 923 is specified, and object ID 923 is private and owned by an application other than the one responding, core 904 will not provide that object to the requesting application. Similarly, if that object is private and owned by another user, that object will not be provided. At 1126, the page is sent to the user. As such, the core can be configured to enforce security of content based on the user or the application.

Figure 12:
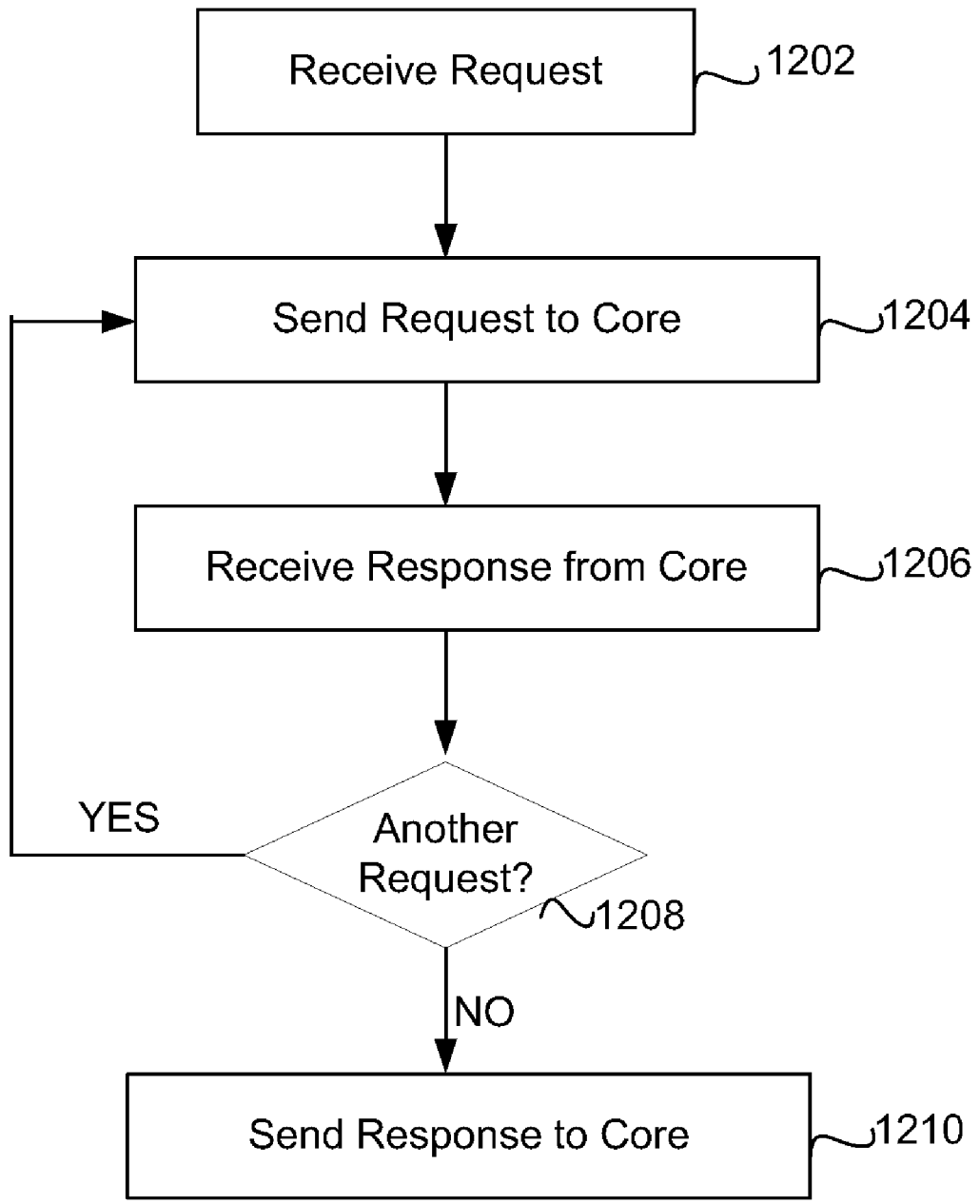
FIG. 12 is a flowchart illustrating an embodiment of a process for responding to a user request.

FIG. 12 is a flowchart illustrating an embodiment of a process for responding to a user request. In some embodiments, this process is implemented in runtime environment 912. In the example shown, the process begins at 1202, in which a request is received. In some embodiments, the request includes the identifier and/or role that was sent from the server at 1106. As such, the server can check the identifier to determine that the user was authenticated (or is an anonymous user or guest, for example). The application can then handle the request based on the user and/or the role of the user with that application. Different application code could be executed based on the user and/or the role. For example, one application might allow a certain user to contribute content, while another application does not. In this way, the creator of each application can decide the rights of each user accessing that application. For example, if the user is anonymous, the application could send a response (i.e., the process would skip to 408, as described more fully below) to send a web page that notifies the user that the user needs to login in order to access this particular application. In some embodiments, the user can have access to different (e.g., better) content by paying a subscription fee to change the user's role to "subscriber". As such, the core can be configured to enforce security of the application based on the user or a role associated with the user.

At 1204, depending on the application instructions, a request (or query) is sent to the core. For example, a request to retrieve all photos tagged "cat" is sent to the core. In some embodiments, the request includes the identifier received at 1206. In some embodiments, the request is delivered using a network API, such as SOAP. For example, a binding can be provided that interprets a PHP request from the application and forwards the request to the core using SOAP. At 1206, a response is received from the core. For example, all photos tagged "cat" are received. The data received from the core is optionally processed. For example, the photos tagged "cat" could be pruned to include only the photos that are also tagged by the user's friends (assuming a list of friends is associated with the user) and/or were added within the last 24 hours. At 1208, if another request is made, the process returns to 1204. Otherwise, at 1210, a response is sent to the core. In some embodiments, the response includes the identifier received at 1106. The response could include the data retrieved at 1206. In some embodiments, the response includes semantic markup tags, such as XML tags, that refer to objects in shared data model 116 (e.g., by object ID), and specifies a view file.

Figure 13:
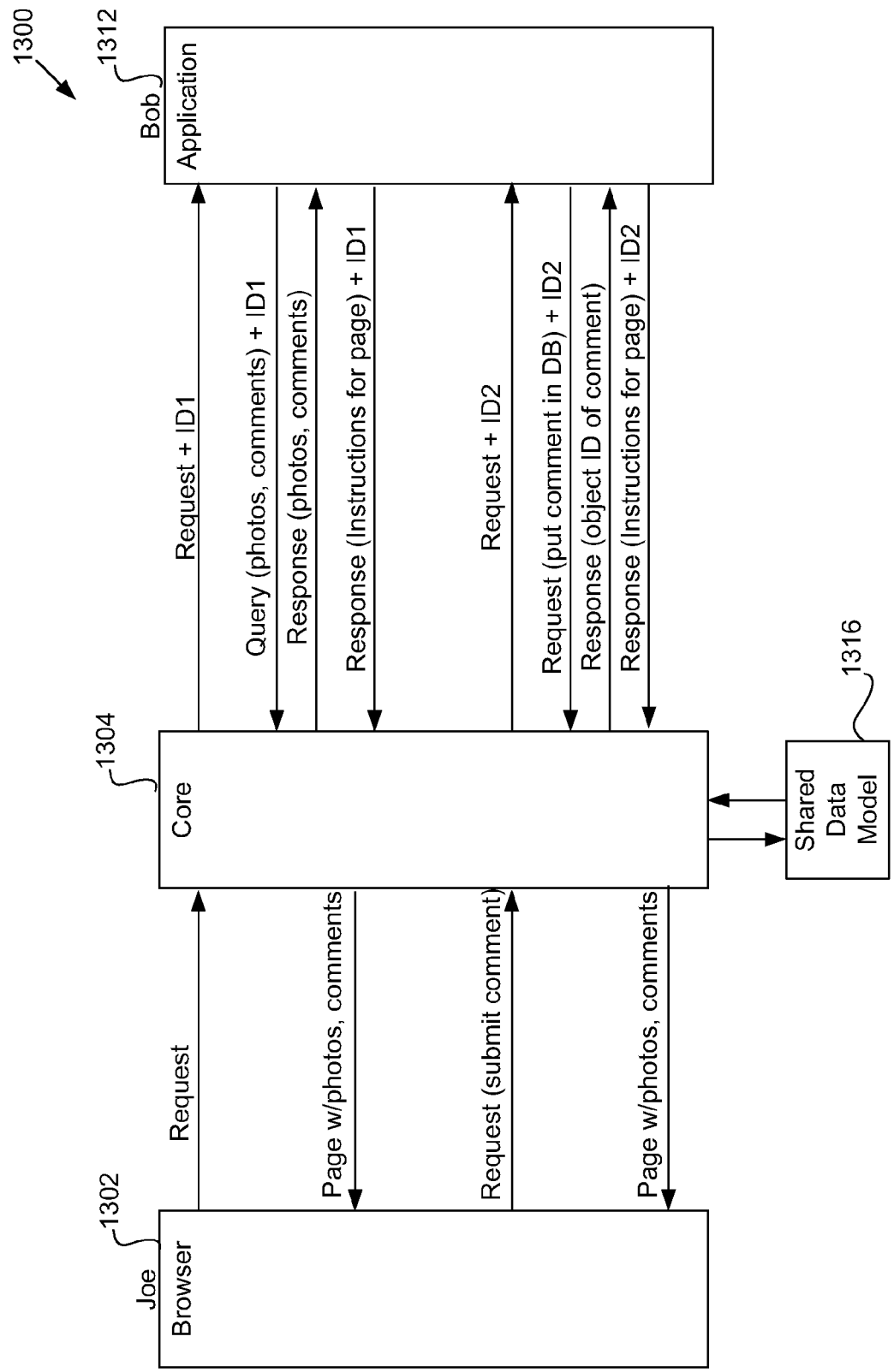
FIG. 13 is a block diagram illustrating an embodiment of an application running on a hosted application server.

FIG. 13 is a block diagram illustrating an embodiment of an application running on a hosted application server. In the example shown, environment 1300 is shown to include browser 1302, core 1304, application 1312, and shared data model 1316. The hosted application server includes core 1304 and a runtime environment running application 1312. In this example, user Joe is running browser 1302. Application 1312 is owned by Bob. Bob is planning a vacation with friends to Hawaii. Application 1312 displays pictures (from shared data model 1316) of places in Hawaii along with his friends' comments on each place. The comments are private and not visible to users who are not Bob's friends. Joe is one of Bob's friends.

In this example, Joe requests Bob's application (e.g., by entering the URL of Bob's application). A request is sent to core 1304 including username joe and a password. Core 1304 receives the request, authenticates Joe, and associates an identifier ID1 with the request. Core 1304 sends the request, ID1, and optionally the username and role to application 1312. Application 1312 receives the request and can determine that the user is joe. Application 1312 sends a query to core 1304 for photos of Hawaii and comments on those photos. The query includes the identifier ID1 so that core 1304 can authenticate the request. Core 1304 receives the request, checks the identifier, and retrieves all content objects of type photo that are tagged Hawaii and all content objects of type comment made by Bob and his friends. Core 1304 only retrieves objects that are public or owned by Bob and his friends. These objects are sent to application 1312. Application 1312 receives the objects.

In this example, the structure of the comment object includes the object ID of the photo being commented on. As such, application 1312 can identify the photos that were commented on by Bob and his friends, and then select a few other photos (e.g., the two photos of Hawaii with the most tags) to display on the page for Joe. Application 1312 sends a response to core 1304. The response includes identifier ID1 so that the server can authenticate the response. The response includes the object IDs of the five photos, the object ID's of the comments, and a description of how they all should be displayed (e.g., view files). Core 1304 receives the response, assembles the page of photos and comments according to the response, and sends the page to browser 1302. Joe then sees in the page the photos commented on by Bob and his friends, and the two photos of Hawaii with the most tags.

Joe views the page of photos and comments, and decides to add a comment of his own. Joe enters a comment, and hits a submit button. A request is sent to core 1304. Core 1304 authenticates Joe and associates a new identifier, ID2, with the request. The request is forwarded along with ID2 to application 1312. Application 1312 receives the request and identifies the user as "joe". Application 1312 tags the comment as private and sends a request to core 1304 to put the comment in shared data model 1316. The request includes ID2. Core 1304 receives the request, checks the identifier, and puts the data in shared data model 1316. An object ID is associated with the object. In some embodiments, a response is sent to application 1312 indicating the object ID of the comment. Application 1312 sends a response to core 1304 including the object IDs of the five photos, the object ID's of the old comments, and the object ID of the new comment. Text can be included, such as "Your comment has been accepted and is only viewable by you and your friends." Core 1304 assembles the page of photos and comments according to the response, and sends it to browser 1302 for display. Joe then sees in the page the photos commented on by Bob and his friends, the two photos of Hawaii with the most tags, Joe's newly added comment, and the text "Your comment has been accepted and is only viewable by you and your friends."

In this example, the comment submitted by Joe is private. If it were instead public, then it would then become available to other applications and users for accessing and viewing. In this way, the shared data model can receive data from multiple applications and share data with multiple applications.

Numerous other applications can be written that retrieve and display the same data objects in various ways. For example, multiple users can write multiple applications that store photo objects in different ways. For example, each photo object could include metadata indicating where the photo was taken. The application could retrieve all photos of Hawaii, determine their locations, and display them on a map of Hawaii at the location at which they were taken. Another application written by another independent user could display the same photos in order of where they lie on the RGB spectrum.

Any type of content object could be used by any application. An application could include content contributed by other applications. For example, Bob could create an application that displays restaurant reviews contributed by his friends using his application. In addition, Bob might include other restaurant reviews contributed by other applications in his restaurant review application. Bob might also include classified ads on a portion of his restaurant reviews page because there might be an incentive provided to include them.

Content Access and Navigation

A method of accessing content is disclosed. In some embodiments, a set of indexed attribute values is specified, and content with indexed attributes matching those values is received. If the indexed attribute values are modified, the view changes to correspond to content with indexed attributes matching the modified values. Examples of indexed attribute values that could be specified include application, user, tag, and type values.

Figure 14:
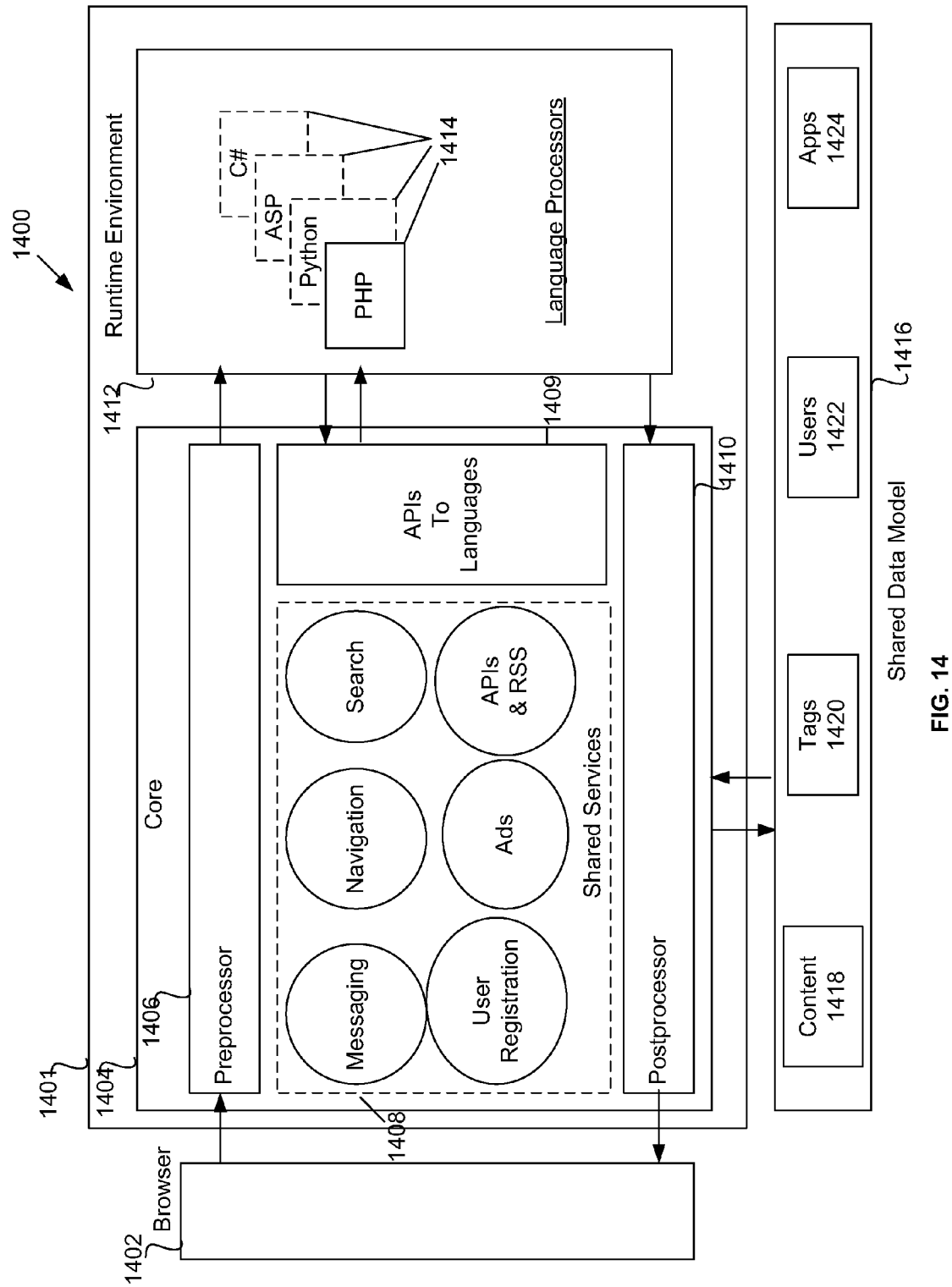
FIG. 14 is a block diagram illustrating an embodiment of a hosted application server.

FIG. 14 is a block diagram illustrating an embodiment of a hosted application server. A hosted application server provides a platform for running multiple applications contributed by multiple developers. In the example shown, environment 1400 is shown to include hosted application server system 1401, browser 1402, and shared data model 1416. Server system 1401 includes core 1404 and runtime environment 1412. Browser 1402 is a web browser or other application capable of viewing data provided over a network, such as the Internet, an intranet or a mobile network.

Core 1404 is shown to include preprocessor 1406, postprocessor 1416, shared services 1408, and APIs to languages 1409. Preprocessor 1406 preprocesses requests from a user at browser 1402. For example, preprocessor 1406 could include mechanisms for user authentication, security, and session management.

Shared services 1408 include various services provided by the host to application developers for use in their applications. For example, shared services 1408 could include messaging, navigation, search, user registration, advertising, APIs, and RSS. Various services not shown could also be provided in various embodiments. For example, external hooks can be provided to other web services such as Amazon, eBay, Google, Visa, Mapquest, etc. APIs 1409 can be used to access shared services 1408. In some embodiments, core 1404 software is written in Java.

Physically, core 1404, runtime environment 1412, and shared data model 1416 can reside on any number of physical devices, each of which can be at any location. In some embodiments, core 1404 and runtime environment 1412 reside on the same physical device.

Shared data model 1416 is a common structure in which data can be stored, shared, and retrieved by multiple applications. Shared data model 1416 includes a shared set of data and data types that can be accessed and modified by multiple applications or users. For example, a user or application could add an object to shared data model 1416 that can then be accessed by other users and applications. A developer could add a new object type and define attributes associated with that object. That content object type can then be made available to other applications.

Shared data model 1416 could include one or more databases or data repositories. Shared data model 1416 is shown to include content 1418, tags 1420, users 1422, and applications 1424. Examples of content could include photos, comments, reviews, classifieds, or other types of user or application contributed content. Data could be contributed and/or defined by users, applications, or the system. Shared data model 1416 could be prepopulated with data. Each object in shared data model 1416 can be associated with one or more tags. Objects can be tagged by one or more users. For example, multiple users could tag a particular photo or restaurant review, or a particular application.

Each object can be owned by an application and/or user. In some embodiments, each object is owned by an application and contributed by a user. The owner of an object can designate the object as public or private, where private objects are only provided to the owner or other users designated (e.g., tagged) by the owner (e.g., the owner's friends or family). Each object has a unique object ID in some embodiments.

Various shared services can utilize the data in shared data model 1416. For example, a search engine service (e.g., in shared services 1408) could be provided that builds an index based on the tags. Advertising can be generated based on tags or content that is retrieved. Profiles can be created based on tag data.

In some embodiments, shared data model 1416 includes a SQL database and a search engine that preindexes various queries for faster access to data. In some embodiments, core 1404 includes a data access layer for accessing data in shared data model 1416.

Runtime environment 1412 can run any number of independently written applications. An application can be written in any language that generates HTML, such as PHP, Python, ASP, C#, Java, Javascript, Ruby or .NET or any language that can be used to view information provided over a network (e.g., the Internet, an intranet, a mobile network, or any other type of network). The applications do not all need to be written in the same language. An application includes calls to APIs 1409 to access shared services 1408.

Any type of application can be developed, any one of which can utilize the set of services and APIs provided by core 1404. Examples of applications that could be created include auctions, product reviews, jobs, social networks, alumni networks, etc. Various tools can be provided for application development. For example, wizards, widgets, and example applications can be provided. Widgets could include, for example, listings, user registration, listings, photos, discussions, blogs, reviews, calendars, maps, rankings, ratings, recommendations, reputation, transactions, tagging, etc. Templates could be provided. For example, a marketplace or dating service template could be provided and multiple applications could be independently created based on that template. Tools could be provided for developers of all skill levels. For example, a wizard or a GUI could be provided for beginning computer users, and example applications (e.g., showing calls to various APIs and making use of various services) could be provided to amateur developers. APIs for mobile platforms could be provided, including photo, email, and/or SMS upload/download, GPS tracking, and alerts. Documentation, discussion boards, books, evangelism, and support could also be provided to help users create and maintain applications.

Core 1404 maintains security between browser 1402 and core 1404, and between core 1404 and runtime environment 1412. Core 1404 can be viewed as a proxy between browser 1402 and an application running in runtime environment 1412. Core 1404 authenticates users so that applications running in runtime environment 1412 do not need to handle user authentication. Applications can trust users authenticated by core 1404, and users can trust applications that are served by server system 1401.

Postprocessor 1410 postprocesses responses from applications running in runtime environment 1412. For example, post processor 1410 assembles output from an application with data from shared data model 1416. In some embodiments, a web page is assembled and sent to browser 1402, where it is displayed. In some embodiments, the output from the application includes instructions written in HTML. The instructions could include XML tags that refer to certain content object IDs and specify how they should be displayed. The content objects could be retrieved from the content database in shared data model 1416 and a page could be assembled based on the specification.

Hosted application servers are more fully described below.

Figure 15:
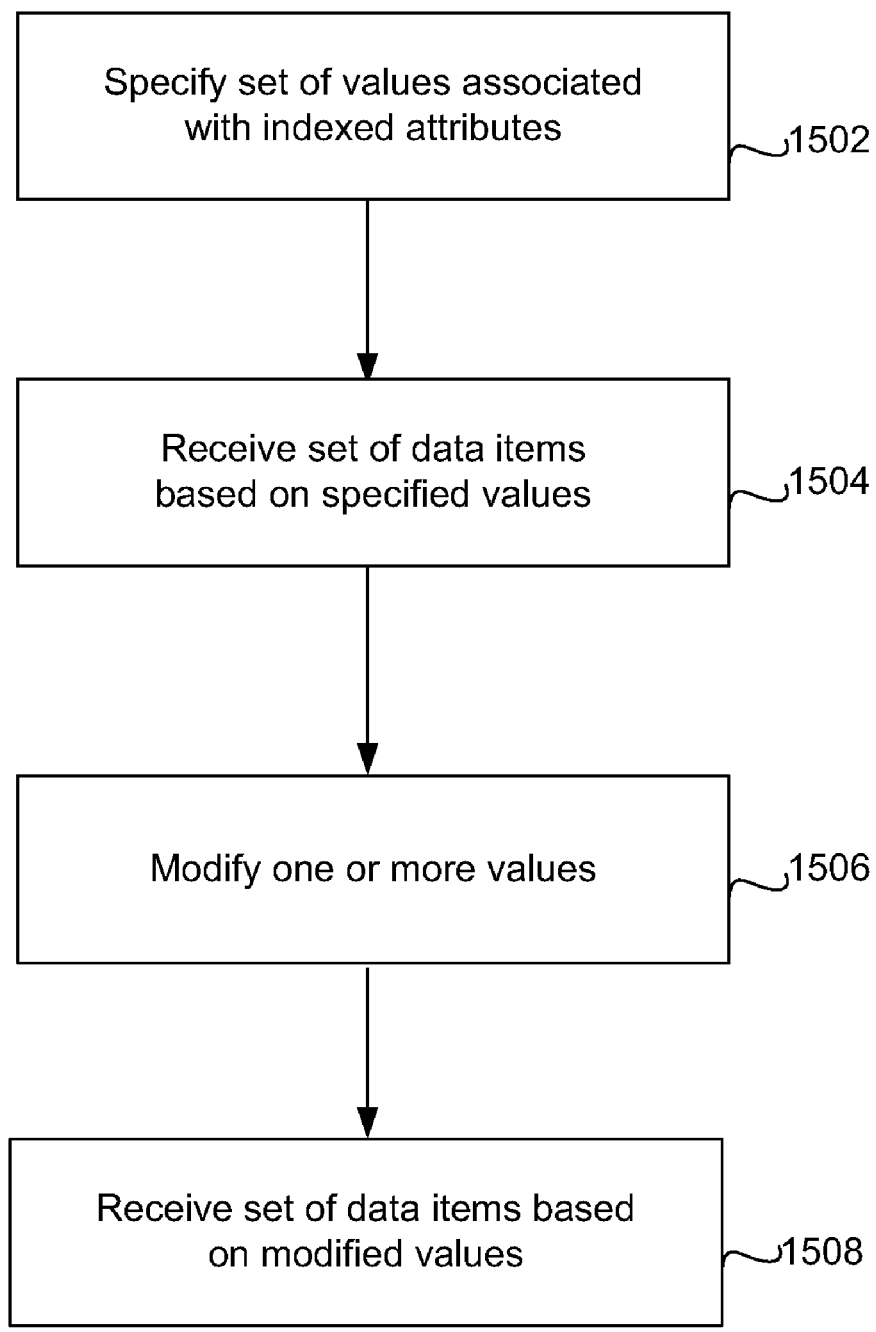
FIG. 15 is a flowchart illustrating an embodiment of a process for accessing content.

FIG. 15 is a flowchart illustrating an embodiment of a process for accessing content. For example, this process may be implemented at browser 1402 to view content in shared data model 1416 associated with hosted application server system 1401. In the example shown, the process begins at 1502. A set of values associated with a set of indexed attributes is specified. For example, the set of indexed attributes could include application, user, tag, and type. These attributes are described more fully below. For example, a user could specify "PhotoSharing", "Mary", "lamb", and "photo" as values of application, user, tag, and type, respectively. This can be done in various ways in various embodiments. In some embodiments, the user specifies these values by selecting a link on a page being viewed. In some embodiments, the user specifies these values by entering them into an appropriate place (e.g., a form or editable field) on the page. In some embodiments, the user specifies these values by specifying them in the URL of the page (e.g., entering them into the address bar in a web browser). For example, a portion of the URL could include "/PhotoSharing/Mary/lamb/photo" or other syntax that indicates application "PhotoSharing", user "Mary", tag "lamb" and type "photo". In some embodiments, browser 102 sends a request including the values to hosted application server 1401.

At 1504, a set of data items is received based on the specified values. "Item", as used herein, refers to any item of data, including a content object, or any other object or structure. "Item" and "object" are sometimes used interchangeably. In some embodiments, hosted application server 1401 retrieves the data items associated with the attribute values from shared data model 1416 and sends them to browser 1402. For example, all photos owned by application "PhotoSharing", contributed by "Mary", tagged "lamb", and of type "photo" are received.

At 1506, one or more of the values is modified. The values can be modified in various ways in various embodiments. For example, the user could change one of the values (e.g., "/PhotoSharing/Mary/lamb/photo" to "/PhotoSharing/Mary/lamb/blog"), or more than one value (e.g., "/PhotoSharing/Mary/lamb/photo" to "/PhotoSharing/any/lamb/blog"). In the latter example, "any" could be a wildcard that indicates that the data item could be associated with (e.g., owned or contributed by)

any user. In addition, fewer or more attributes (or different attributes) could be specified. For example, a value for a location attribute can be specified (e.g., "/PhotoSharing/Mary/lamb/blog/New Zealand"). Other examples of attributes include date (e.g., contributed in the last day), size (e.g., smaller than 100 kB), child rating (e.g., approved for viewing by children under 13).

At 1508, a set of data items is received based on the modified values. In some embodiments, hosted application server 1401 retrieves the data items associated with the modified attribute values from shared data model 1416 and sends them to browser 1402. In this way, a user can navigate across data in the shared data model, including across content, users, and applications.

Figure 16:
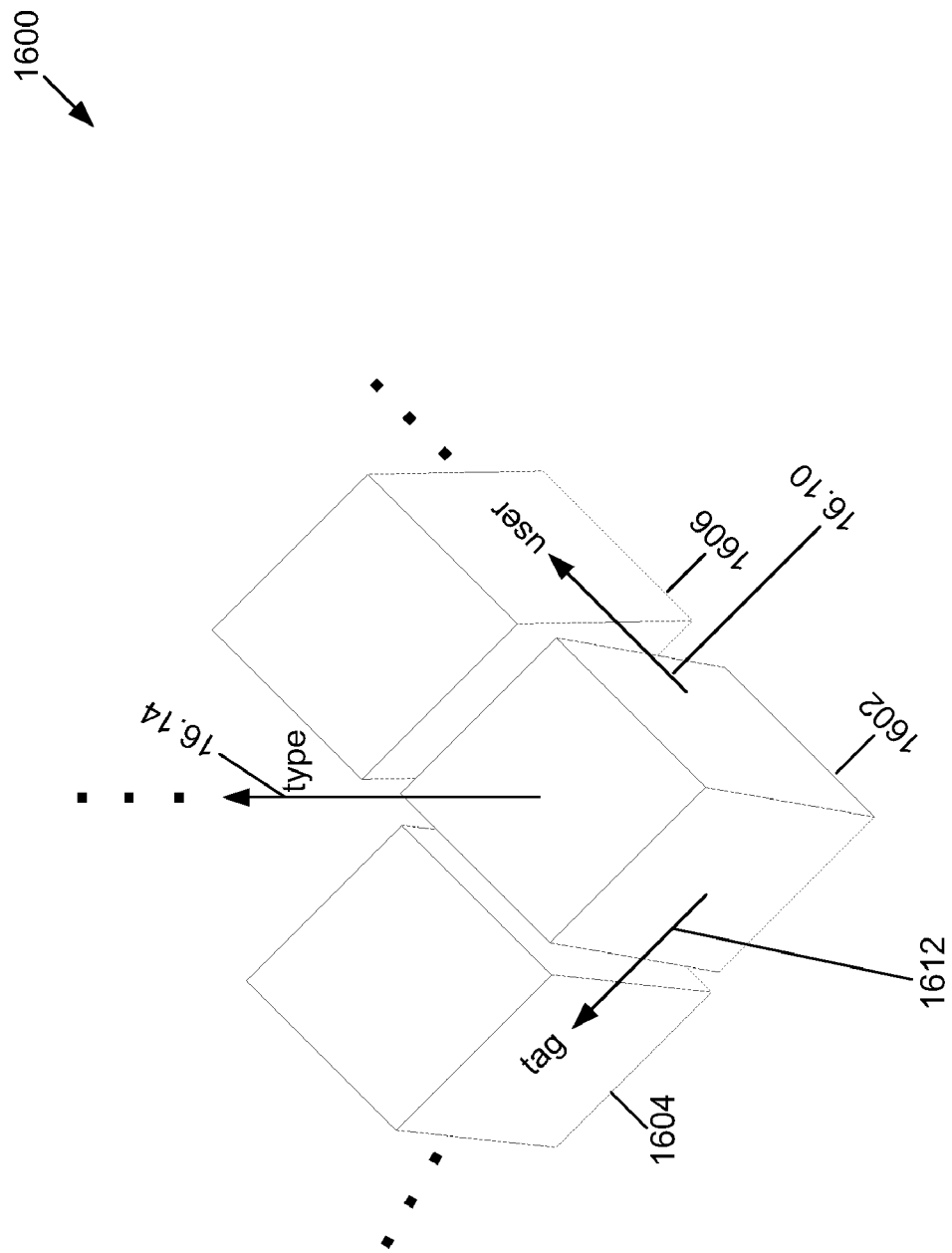
FIG. 16 illustrates a conceptual diagram of a pivot view.

FIG. 16 illustrates a conceptual diagram of a pivot view. In this example, a pivot view is a user interface in which a user can select or be presented with a starting set of content or data based on one or more indexed attribute values (e.g., tag, user, etc.). The values of the attributes can be changed so that a user can pin, unpin, or laterally pivot across a shared data model, as more fully described below.

A pivot, pivot view, or view refers to a slice through the shared data model, such as "/PhotoSharing/Mary/lamb/blog" or "/any/lamb/blog". Pivoting refers to the process of going from one view to another, such as going from "/Mary/lamb/photo" to "/Mary/lamb/blog" or "/any/lamb/blog". Pinning refers to going from "any" to a specific value for a given indexed attribute, such as going from "/Mary/any/photo" to "/Mary/lamb/photo". Unpinning refers to going from a specific value to "any" for a given indexed attribute, such as going from "/Mary/lamb/photo" to "/Mary/any/photo". A lateral pivot refers to going from one specific value to another specific value for a given indexed attribute, such as going from "/Mary/lamb/photo" to "/Mary/lamb/blog".

Pivoting can be performed in various ways in various embodiments. For example, the user can pivot using a system pivot view user interface (or system pivot view). In some embodiments, the system pivot view is an application provided by the hosted application server system for pivot browsing. The URL can be used as a command line for pivoting, as more fully described below. In addition, an application could include PHP or XML code that queries the core for content using an API.

In the example shown, conceptual diagram 1600 includes block 1602 and axes 1610, 1612, and 1614. Block 1604 is one of a plurality of blocks positioned along axis 1612 and block 1606 is one of a plurality of blocks positioned along axis 1610. A plurality of blocks (not shown) are positioned along axis 1614. Block 1602 represents a pivot view with a starting set of values for the attributes user, tag, and type. For example, block 1602 could represent "/Mary/lamb/photo" (or all items satisfying user="Mary", tag="lamb", type="photo"). Other blocks positioned along axis 1610 represent views with the same tag and type as block 1602, but different users. For example, block 1606 could represent "/John/lamb/photo". Other blocks positioned along axis 1604 represent views with the same user and type as block 1602, but different tags. For example, block 1604 could represent "/Mary/horse/photo". Similarly, other blocks positioned along axis 1614 represent views with the same user and tag, but different types.

As such, "/any/lamb/photo" is represented by all the blocks along axis 1610. Similarly, "/Mary/lamb/any" is represented by all the blocks along axis 1612. In this way, it can be seen how a user "pivots" through a shared data model to obtain different views. The user can pin, unpin, and/or change (lateral pivot) one or more values of one or more indexed attributes.

In this example, a 3-D example is shown. A user could pivot through any number of dimensions representing any number of indexed attributes in other embodiments. Other examples of indexed attributes that can be specified include application, location, time, size, popularity, rating, or any user or developer defined attribute of an object. For example, the user may want to further constrain the pivot view to "/Mary/lamb/photo/?CreatedDateGT=12-10-2004", which could indicate all data items contributed by "Mary", tagged "lamb", or type "photo", and contributed (or created) after Dec. 10, 2004. As another example, a developer could define an object of type "car" that includes attributes "make" and "year". A user could then request a pivot view of "/any/any/any/car?make=Ford", for example. Any appropriate syntax could be used in various embodiments. The user could specify a pivot view of "/PhotoSharing/Mary/lamb/photo/" to constrain the pivot view to the application "PhotoSharing".

In some embodiments, the indexed attributes are variable in that the number of indexed attributes and/or the indexed attributes themselves can change between pivots. For example, new indexed attributes could be added, such as "location", as described above, or "make" or "year", as in the above example. The indexed attributes can also be removed. For example, a "make" value could be specified in one pivot view, but not specified in the next pivot view. A user can pivot from n dimensions to m dimensions, where n and m can be any number. In addition, different indexed attributes can be specified in between pivots. For example, a "/any/any/any/car?make=Ford" value could be specified in one pivot view, and "/any/any/any/car?year<1969" could be specified in the next pivot view. As such, the number of dimensions and the dimensions themselves can be variable.

In some embodiments, a thesaurus mechanism is provided for equating similar indexed attribute values. For example, "/any/any/flowers/any" could indicate all objects tagged "flowers" or tagged "flower".

Figure 17A:
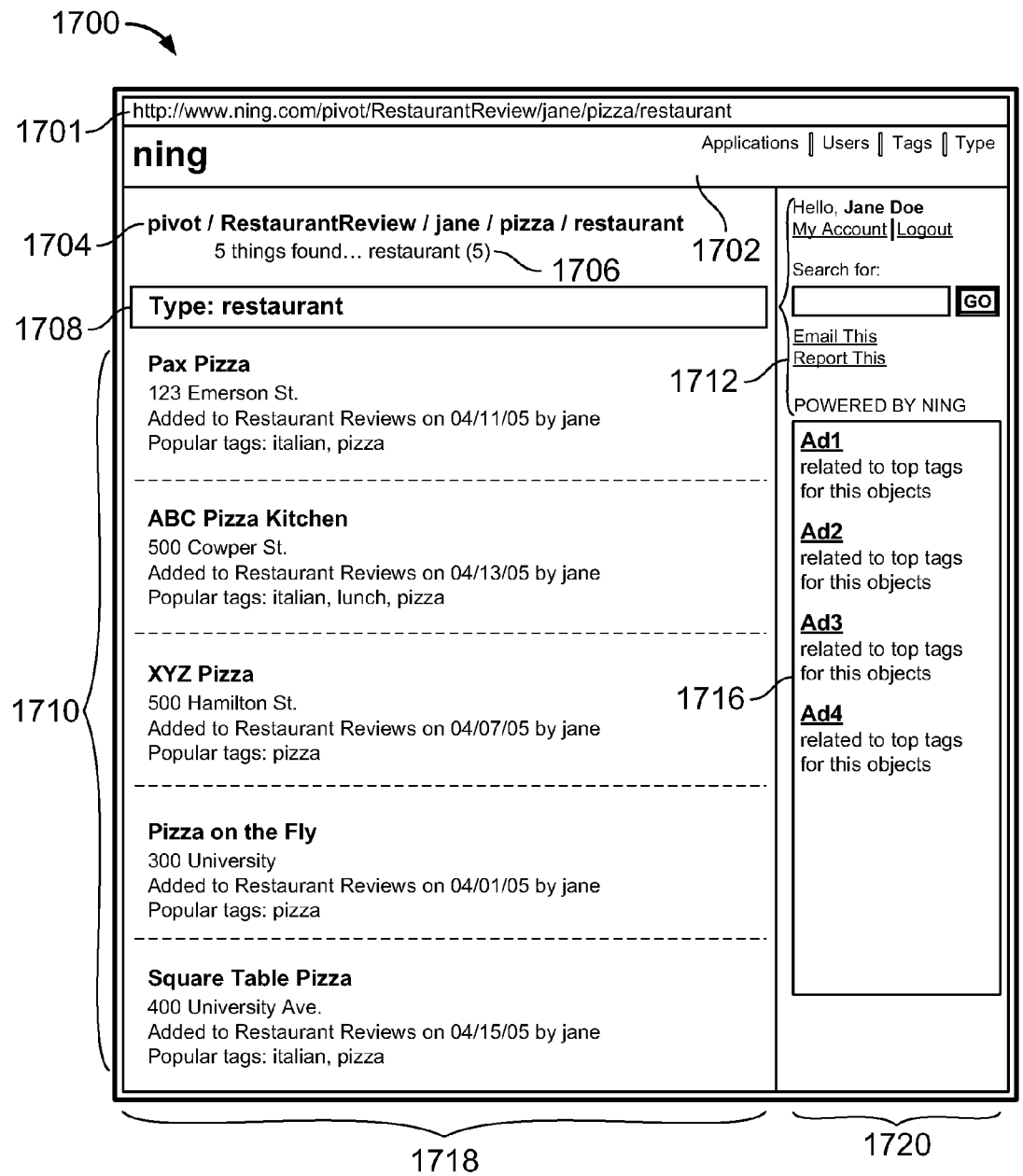
FIG. 17A illustrates an embodiment of a system pivot view interface.

FIG. 17A illustrates an embodiment of a system pivot view interface. In some embodiments, the system pivot view interface (or system pivot view) is an application provided by the system. The system pivot view includes links that lead to pages in the system pivot view or to pages within an application. In the example shown, interface 1700 is displayed in a browser window that includes a title bar 1701. In this example, interface 1700 is shown to include title bar 1702, left hand side 1718, and sidebar 1720.

Title bar 1702 is shown to include the system name, in this case "ning". In this example, links labeled "Applications", "Users", "Tags", and "Type" are shown in the upper right of title bar 1702. Selecting the "Applications" link, for example, leads to a page showing a list of all applications in the system.

Left hand side 1718 displays a system pivot view that allows users to view data in the shared data model. Left hand side 1718 is shown to include interface 1704 for specifying a pivot view, text 1706, subtitle bar 1708, and list 1710 of items associated with that view. Interface 1704 indicates the current view being displayed. In this example, interface 1704 is a URL style interface and values of various attributes are specified in between forward slashes ("/"). For example, interface 1704 could include an editable field. In some embodiments, attribute values are specified as follows:

/pivot/[application]/[user]/[tag]/[type]

For example, "pivot/RestaurantReview/jane/pizza/restaurant" specifies data items that are owned by application "RestaurantReview", contributed by user "jane", tagged "pizza", and of type "restaurant". Interface 1704 can be edited to pivot to other views. For example, a user could change "jane" to "john" so that interface 1704 reads "pivot/RestaurantReview/john/pizza/restaurant".

Similarly, address bar 1701 displays the current view. In this example, address bar 1701 displays "http://www.ning-.com/pivot/RestaurantReview/jane/pizzakestaurant". A user could edit the URL to pivot to a different view, such as to change "jane" to "john". In this way the URL acts as a command line interface.

Text 1706 indicates the number of items associated with the current view. Subtitle bar 1708 indicates that items of type "restaurant" are listed below. List 1710 is a list of items associated with the current view. In this case, list 1710 is a list of all items owned by application "RestaurantReview", contributed by user "jane", tagged "pizza", and of type "restaurant". The items can be displayed in various ways in various embodiments. For example, a phone number or image could be shown for each listing in other embodiments.

Sidebar 1720 can be viewed as a tool for navigating across content in the shared data model. In some embodiments, sidebar 1720 is provided by the hosted application server system. For example, sidebar 1720 could be provided by a sidebar engine running on the core of the hosted application server. Sidebar 1720 can include links that lead to pages in a system pivot view, or to pages within an application.

In this example, sidebar 1720 is shown to include interfaces 1712 to provide access to various system services, including user registration and account management, search, email this page, and report this page. For example, interface 1712 is shown to include links to "My Account", "Logout", "Email This", and "Report This". A search interface is also shown. Selecting "My Account" opens a page showing account options. Selecting "Logout" logs out the current user "Jane Doe". Selecting "Email This" expands the sidebar to include a "To" field as well as an optional "Body" field so that the user can email the page. Selecting "Report This" expands the sidebar to include check boxes for Abuse, Spam, Fraud, and Adult, as well as Submit and Cancel buttons. The search interface includes a Search field and Go button to allow a simple search across the system. For example, a user could submit a search query for "great" and the result could include any application, user, tag, or type with the value "great". Sidebar 1720 is also shown to include advertising 1716. In some embodiments, advertisements that are related to the content of the system pivot view are displayed here. Sidebar 1720 could include any other links that lead to other pages in the system pivot view. For example, links associated with ranking, rating, review, reputation, or tagging of various objects could be included.

In this example, the left hand side of interface 1700 shows a system pivot view. The left hand side can be used to show the system pivot view or an application. In some embodiments, a system pivot view is an application that is provided by the system. In some embodiments, sidebar 1720 is displayed regardless of whether the left hand side is displaying a system pivot view (as shown) or an application. If the left hand side displays an application, then submitting a search query in sidebar 1720 causes the left hand side to display the system pivot view with results of the search query.

Figure 17B:
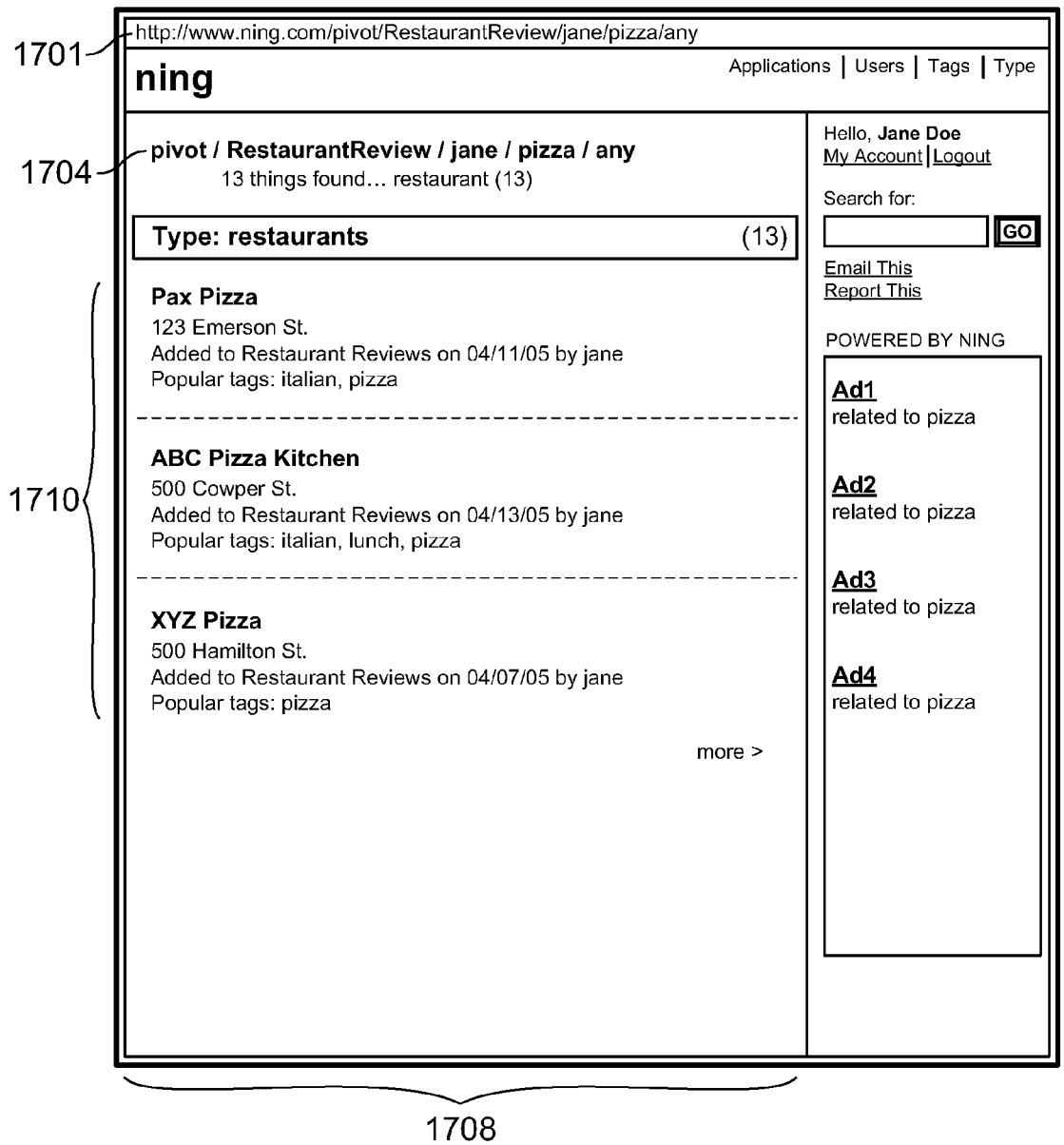
FIG. 17B illustrates an embodiment of a system pivot view interface.

FIG. 17B illustrates an embodiment of a system pivot view interface. In this example, the view shown in FIG. 17A has been changed to "pivot/RestaurantReview/jane/pizza/any". This can be done by editing interface 1704 or by modifying the URL in address bar 1701. List 1710 includes all items owned by application "RestaurantReview", contributed by user "jane", and tagged "pizza". The items may be of any type. In this example, the type attribute is unconstrained.

FIG. 17C illustrates an embodiment of a system pivot view interface. In this example, the view shown in FIG. 17A has been changed to "pivot/RestaurantReview/jane/any/any". List 1710 includes all items owned by application "RestaurantReview" and contributed by user "jane". In this example, the type and tag attributes are unconstrained. List 1710 includes tags, items of type restaurant, and items of type comment.

FIG. 17D illustrates an embodiment of a system pivot view interface. In this example, the view shown in FIG. 17A has been changed to "pivot/RestaurantReview/any/any/any". List 1710 includes all items owned by application "RestaurantReview". In this example, the user, type, and tag attributes are unconstrained. List 1710 includes tags, items of type restaurant, and items of type comment.

FIG. 17E illustrates an embodiment of a system pivot view interface. In this example, the view shown in FIG. 17A has been changed to "pivot/any/any/jane/any". List 1710 includes all items contributed by user "jane". In this example, the application, type, and tag attributes are unconstrained. List 1710 includes applications, tags, items of type photo, and items of type restaurant (not fully shown).

FIG. 17F illustrates an embodiment of a system pivot view interface. In this example, the view displayed in system pivot view 1718 has been changed to "pivot/any/any/any/restaurant". List 1710 includes all items of type "restaurant". In this example, the application, user, and tag attributes are unconstrained. List 1710 includes items of type restaurant.

Each item can be displayed differently. In some embodiments, each item is displayed according to a view file associated with that item. For example, Jane could create a type "restaurant" that includes attributes "name" and "address". Jane could associate a view file with the object. Jane could create a view file or use a preexisting view file. The view file could specify, for example, that the "name" be displayed on line 1 and the "address" be displayed on line 2. Similarly, another user John could create a type "restaurant" that includes attributes "restaurant" and "image", where the image could point to an image file. John could associate a view file with the object. When the system pivot view displays items of type "restaurant" contributed by "jane", the view file created by Jane could be specified and used to display the object. Likewise, when the system pivot view displays items of type "restaurant" contributed by "john", the view file created by John could be specified and used to display the object. The view file could be specified by the application developer or the user. If a view file is not associated with an object, a default view could be used to display the object. For example, the default view could specify that the values of the attributes associated with that object be displayed consecutively on separate lines.

Items can be displayed in various ways in various embodiments. For example, when type is "any", objects could be displayed similarly to FIG. 18, in which object names are listed with various font sizes based on various criteria. Attributes of the objects do not need to be shown.

FIG. 18 illustrates an embodiment of a system pivot view interface. In some embodiments, the system pivot view interface is an application provided by the hosted application server. In the example shown, the pivot view "/pivot/any/any/any/any" is displayed and all objects in the shared data model are listed. The objects can be displayed in any appropriate way. In this example, the list of objects is grouped by object type. For example, all objects of type "application" are displayed, followed by all objects of type "tag", and all objects of type "user". Object names are listed in text, and the font is sized based on the popularity of the object (for example, the number of times that object has been viewed). For example, the application "PhotoSharing", the tags "Mexican" and "wow", and the user "steve" are shown in larger font. "PhotoSharing" has been viewed more than any other application. "Mexican" and "wow" are the most used tags. "steve" has contributed the most tags.

FIG. 19 illustrates an example of using the URL as a command line interface. In this example, the page "http://www.ning.com/applications" is shown. Including "applications" after "http://www.ning.com" causes a list of applications in the system to be displayed. The list could be specified to be an alphabetical list in paragraph format of the most active applications with font size dependent on the number of times the application has been viewed.

Various other commands can be entered in the URL, such as in "http://www.ning.com/[command]" or any other form. For example, the command "user" could cause an alphabetical list of the most active users to be displayed, with the ability to select between various views, such as by number of applications, by content objects contributed, or by number of tags contributed. Similarly, the command "tag" could cause an alphabetical list of the most active tags to be displayed, with font size dependent on the number of instances of that tag. The command "popular" could cause a list of the most popular applications, tags, users, content types, and content objects to be displayed, with the ability to reorder by most popular in the last day, in the last week, or overall. The command "detail/[object ID]" could cause a system view of a content object with that object ID to be displayed. The command "typeindex" could cause a list of content types and content type statistics to be displayed. The list could be ordered by number of content objects. In addition, the previously described "pivot/[application]/[user]/[tag]/[type]", is another command that could be entered.

Modifiers could be added to commands. Examples of modifiers include "orderby" (chronological, most viewed, least popular, etc.), "sortby" (user, tags, etc.), "format" (rss, etc.). For example, adding "?groupby=[user, application, or tag]" to "typeindex" causes the list to be grouped as specified. Adding "?sortby=[newest, tagcount, most popular]" could cause the list to be sorted as specified. Adding "?format=rss" could cause the page to be formatted in RSS.

In some embodiments, modifiers include developer contributed attributes. For example, a first developer could create an object type "car" with attributes "make" and "model". A second developer could create an object type "car" with attributes "make" and "year". A user could then enter "pivot/any/any/any/car?make=ford", which would cause a list of objects of type car having an attribute "make" with value "ford" to be displayed. The list could include objects with object type "car" as defined by the first developer or as defined by the second developer. In some embodiments, more than one modifier can be specified. For example, both a "make" and "model" value could be specified.

When a developer creates or defines a new object type, various attributes of that object are also defined. In some embodiments, each attribute is associated with a name and type. Here, "type" refers to the type of value associated with that attribute, such as a string, number, date, URL, file (e.g., image, PDF, MP3), etc. Any of these attributes can be specified as modifiers in various ways. For example, entering "pivot/any/any/any/car?year>1969 &year<1971" could cause a list of objects of type "car" having a "year" attribute with value greater than 1969 and less than 1971 to be displayed.

FIG. 20A illustrates an embodiment of an application. In the example shown, an application "RateHogwartsProfs" is displayed. For example, a developer could have created the application using a wizard, a template, or example code. In this example, the application allows users to submit reviews and rate professors at Hogwarts. The left hand side of the page displays a list of teachers and various attributes associated with each teacher, as specified by the developer. In some embodiments, each teacher is displayed according to a view file that specifies, for example, that the teacher's name be on line 1, the department on line 2, etc. Above the list on the left hand side, a user can select several "Sort by" options. Selecting a teacher's name could lead to a page profiling that teacher. Selecting a department name could lead to a page profiling that department, as more fully described below. Such pages can be created by the developer of the application.

In this example, the right hand side includes a system sidebar. In some embodiments, the system sidebar includes links to the system pivot view interface. In some embodiments, the system sidebar is similar to system sidebar 1720. In the example shown, the system sidebar includes a list of the user's top tags in the application ("MY TOP TAGS IN RATE-HOGWARTSPROFS", a list of top tags in the application ("TOP TAGS IN RATEHOGWARTSPROFS", and a list of top users in the application ("TOP USERS IN RATE HOGWARTSPROFS"). Top tags can be defined in various ways in various embodiments.

Selecting "great" under "TOP TAGS IN RATEHOGWARTSPROFS" opens the system pivot view interface to pivot view "/pivot/ratehogwartsprofs/any/great/any" so that all objects in "RateHogwartsProfs" tagged "great" are displayed on the left hand side. The system sidebar on the right hand side could change to include information relevant to the system pivot view interface.

For example, the system sidebar could include the following:

"Most popular great content across Ning

All great content across Ning: photo (2099), review (1818), blog (1601)

Your great content across Ning: photo (196), comment (17), restaurant (3)"

In this example, selecting "great" in "Most popular great content across Ning" could open a system pivot view interface to pivot view "/pivot/any/any/great/any". For example, the left hand side could display the top 20 content objects tagged "great".

"photo", "review", and "blog" could be the top three types by number of instances. Selecting "photo", "review", or "blog" in "All great content across Ning" could lead to a tag and type-pinned system pivot view. For example, selecting "photo" could open system pivot view to view "/pivot/any/any/great/photo".

"photo", "comment", and "restaurant" could be the top three types by number of instances associated with the current user. Selecting "photo", "comment", or "restaurant" in "Your great content across Ning" could lead to a user, tag, and type-pinned system pivot view. For example, selecting "comment" could open a system pivot view to view "/pivot/any/bob/great/comment", assuming the current user is "bob".

FIG. 20B illustrates an embodiment of an application. In the example shown, an application "RateHogwartsProfs" is displayed. In some embodiments, selecting "Mechanical Engineering" in the page of FIG. 20A leads to this page. In this example, the left hand side of the page displays a list of teachers in the mechanical engineering department. The system sidebar could remain the same or could include different links that are relevant to the content of the left hand side.

FIG. 21 illustrates an embodiment of an application. In the example shown, an application "PhotoSharing" is displayed.

For example, this application could have been written by another developer, perhaps using the application "RateHogwartsProfs" as a template. For example, this developer could have copied the source code from the "RateHogwartsProfs" application. (Referring back to FIG. 20A, this developer could have selected in the system sidebar either "View Source" or "Clone this App"). In this example, the application allows users to submit, comment on, and tag photos. The left hand side of the page displays a list of photos and various attributes associated with each photo, as specified by the developer. In some embodiments, each photo is displayed according to a photo view file.

In this example, the right hand side includes a system sidebar. In some embodiments, the system sidebar includes links to the system pivot view interface, as previously described. For example, clicking on "steve" under "TOP USERS IN PHOTOSHARING" opens the system pivot view interface to view "/pivot/photosharing/steve/any/any" so that all objects in "PhotoSharing" contributed by "steve" are displayed. The system sidebar on the right hand side could also change to include information relevant to the system pivot view interface. A search interface is provided to allow the user to search for data items in the shared data model, as previously described.

Any other information could be shown in the system sidebar. For example, "This application has been tagged: great by bob, funny by kim, bookmark by john", could be included, where "great", "funny" and "bookmark" are three tags given to this application by three users. In some embodiments, selecting "great" opens the system pivot view interface to pivot view "/pivot/any/any/great/any". In some embodiments, selecting "great" opens the system pivot view interface to pivot view "/pivot/any/bob/great/any". Similarly, selecting "bob" could open the system pivot view interface to pivot view "/pivot/any/bob/any/any" or to various other views in other embodiments.

In various embodiments, the system sidebar can be located in other portions of the page besides the right hand side. The system sidebar can have any formatting, including any shape, size, location, or other visible or non-visible attribute. The system sidebar does not need to be in a sidebar.

In some embodiments, objects can be designated as private and public by their owners. A user can only view objects that the user owns or that are designated public. In some embodiments, users are encouraged to designate objects as public. For example, users could be given a higher storage quota when objects are designated as public.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of interacting with a shared data model, including:

storing a plurality of applications in an application repository, each application executable in a runtime environment of a hosted application server and having an application owner identifier, the plurality of applications including a first application having a first application owner identifier, and a second application having a second application owner identifier that is different than the first application owner identifier;

storing, in the shared data model, a plurality of content objects and a plurality of attributes, wherein the plurality of attributes includes:

a plurality of application attributes, each application attribute specifying an application owner identifier of an application owning a content object with which the attribute is associated, the application being one of the plurality of applications stored in the application repository, a plurality of type attributes, each type attribute specifying a content type of a content object with which the attribute is associated, each content type specifying a plurality of attributes of its associated content object; and a plurality of privacy attributes, each privacy attribute associated with a content object and specifying a degree of access to the associated content object by applications other than the application specified by the application attribute of the associated object;

executing the first application in the runtime environment of the hosted application server;

executing the second application in the runtime environment of the hosted application server;

receiving, by a system core from the first application, a request for a content object;

determining by the system core, based at least in part on the application owner identifier of the content object and on the privacy attribute of the content object, that the first application has access to the content object;

providing the content object from the shared data model by the system core to the first application responsive to the system core determining that the first application has access to the content object;

receiving, by the system core from the second application, a request for the content object, the requested content object being the same content object as provided to the first application;

determining by the system core, based at least in part on the application owner identifier of the content object and on the privacy attribute of the content object, that the second application has access to the content object; and providing the content object from the shared data model by the system core to the second application responsive to determining that the second application has access to the content object.

2. The method of claim 1, further comprising receiving a request for information about one or more attributes of one or more content objects.

3. The method of claim 1, further comprising receiving a request for information about an attribute associated with a content object.

4. The method of claim 1, further comprising receiving a request for information about one of a plurality of attributes associated with a content object.

5. The method of claim 1 further comprising receiving a request for information about an attribute name, attribute value, or attribute type.

6. The method of claim 1, further comprising receiving a request for information about a content type.

7. The method of claim 1, further comprising receiving a request for information about an attribute defined by a system associated with the shared data model.

8. The method of claim 1, further comprising receiving a request for information about an attribute defined by an application that owns a content object associated with the attribute.

9. The method of claim 1, further comprising receiving a request for information about an attribute defined by an application that did not contribute a content object associated with the attribute.

10. The method of claim 1, further comprising receiving a request for information about an attribute defined by a user.

11. The method of claim 1, wherein each content object can be contributed by a user, an application, or a system associated with the shared data model.

12. The method of claim 1, wherein at least one of the requests for the content object includes an attribute value for one of the plurality of attributes stored in the shared data model.

13. The method of claim 1, wherein at least one of the requests for the content object includes a content type of the requested content object.

14. The method of claim 1, wherein at least one of the requests for the content object is received via an API, UI, GUI, command line interface (CLI), or URL.

15. The method of claim 1, further comprising:
    determining, based at least in part on the application owner identifier of the application owning the content object, that the first application has access to the content object; and
    determining, based at least in part on the application owner identifier of the application owning the content object, that the second application has access to the content object;
    wherein the content object is provided from the shared data model to the first application responsive to determining that the first application has access to the content object, and the content object is provided from the shared data model to the second application responsive to determining that the second application has access to the content object.

16. The method of claim 1, wherein in the hosted application server has a plurality of language processors adapted to execute the plurality of applications, the first application comprising code of a first language executable by a first of the language processors, and the second application comprising code of a second language executable by a second of the language processors.

17. A computer system for interacting with a shared data model, including at least one computer having a processor and a memory, and configured by computer program instructions in the memory to:
    store a plurality of applications in an application repository, each application executable in a runtime environment of a hosted application server and having an application owner identifier, the plurality of applications including a first application having a first application owner identifier, and a second application having a second application owner identifier that is different than the first application owner identifier;
    store, in the shared data model, a plurality of content objects and a plurality of attributes, wherein the plurality of attributes includes:
        a plurality of application attributes, each application attribute specifying an application owner identifier of an application owning a content object with which the attribute is associated, the application being one of the plurality of applications stored in the application repository,
        a plurality of type attributes, each type attribute specifying a content type of a content object with which the attribute is associated, each content type specifying a plurality of attributes of its associated content object, and
        a plurality of privacy attributes, each privacy attribute associated with a content object and specifying a degree of access to the associated content object by applications other than the application specified by the application attribute of the associated object;
    execute the first application in the runtime environment of the hosted application server;
    execute the second application in the runtime environment of the hosted application server;
    receive, by a system core from the first application, a request for a content object;
    determine by the system core, based at least in part on the application owner identifier of the content object and on the privacy attribute of the content object, that the first application has access to the content object;
    provide the content object from the shared data model by the system core to the first application responsive to the system core determining that the first application has access to the content object;
    receive, by the system core from the second application, a request for the content object, the requested content object being the same content object as provided to the first application;
    determine by the system core, based at least in part on the application owner identifier of the content object and on the privacy attribute of the content object, that the second application has access to the content object; and
    provide the content object from the shared data model by the system core to the second application responsive to determining that the second application has access to the content object.

18. The system of claim 17, wherein the computer system is further configured to receive a request for information about one or more attributes of one or more content objects.

19. The system of claim 17, wherein the computer system is further configured to receive a request for information about an attribute associated with a content object.

20. The system of claim 17, wherein the computer system is further configured to receive a request for information about an attribute defined by a user.

21. The system of claim 17, wherein the request is received via an API, UI, GUI, command line interface (CLI), or URL.

22. The computer system of claim 17, wherein the computer system is further configured to:
    determine, based at least in part on the application owner identifier of the application owning the content object, that the first application has access to the content object; and
    determine, based at least in part on the application owner identifier of the application owning the content object, that the second application has access to the content object;
    wherein the content object is provided from the shared data model to the first application responsive to determining that the first application has access to the content object, and the content object is provided from the shared data model to the second application responsive to determining that the second application has access to the content object.

23. A computer program product for interacting with a shared data model, the computer program product being embodied in a non-transitory computer readable storage medium and comprising computer instructions that when executed by a processor perform the following actions:
    storing a plurality of applications in an application repository, each application executable in a runtime environment of a hosted application server and having an application owner identifier, the plurality of applications including a first application having a first application owner identifier, and a second application having a second application owner identifier that is different than the first application owner identifier;

storing, in the shared data model, a plurality of content objects and a plurality of attributes, wherein the plurality of attributes includes:
- a plurality of application attributes, each application attribute specifying an application owner identifier of an application owning a content object with which the attribute is associated, the application being one of the plurality of applications stored in the application repository,
- a plurality of type attributes, each type attribute specifying a content type of a content object with which the attribute is associated, each content type specifying a plurality of attributes of its associated content object; and
- a plurality of privacy attributes, each privacy attribute associated with a content object and specifying a degree of access to the associated content object by applications other than the application specified by the application attribute of the associated object;

executing the first application in the runtime environment of the hosted application server;

executing the second application in the runtime environment of the hosted application server;

receiving, by a system core from the first application, a request for a content object;

determining by the system core, based at least in part on the application owner identifier of the content object and on the privacy attribute of the content object, that the first application has access to the content object;

providing the content object from the shared data model by the system core to the first application responsive to the system core determining that the first application has access to the content object;

receiving, by the system core from the second application, a request for the content object, the requested content object being the same content object as provided to the first application;

determining by the system core, based at least in part on the application owner identifier of the content object and on the privacy attribute of the content object, that the second application has access to the content object; and providing the content object from the shared data model by the system core to the second application responsive to determining that the second application has access to the content object.

24. The computer program product of claim 23, the computer instructions further comprising receiving a request for information about one or more attributes of one or more content objects.

25. The computer program product of claim 23, the computer instructions further comprising receiving a request for information about an attribute associated with a content object.

26. The computer program product of claim 23, the computer instructions further comprising receiving a request for information about an attribute defined by a user.

27. The computer program product of claim 23, wherein receiving the request includes receiving an attribute value.

28. The computer program product of claim 23, wherein the received request specifies a content type of the requested content object.

29. The computer program product of claim 23, wherein at least one of the requests for the content object is received via an API, UI, GUI, command line interface (CLI), or URL.

30. The computer program product of claim 23, wherein the computer instructions further comprising:
- determining, based at least in part on the application owner identifier of the application owning the content object, that the first application has access to the content object; and
- determining, based at least in part on the application owner identifier of the application owning the content object, that the second application has access to the content object;
- wherein the content object is provided from the shared data model to the first application responsive to determining that the first application has access to the content object, and the content object is provided from the shared data model to the second application responsive to determining that the second application has access to the content object.

31. The computer program product of claim 23, wherein the hosted application server has a plurality of language processors adapted to execute the plurality of applications, the first application comprising code of a first language executable by a first of the language processors, and the second application comprising code of a second language executable by a second of the language processors.

* * * * *